US012768321B2

(12) United States Patent
Iname et al.

(10) Patent No.: US 12,768,321 B2
(45) **Date of Patent: *Oct. 20, 2026**

(54) FUEL REFORMING SYSTEM FOR VEHICLE

(71) Applicant: Mazda Motor Corporation, Hiroshima (JP)

(72) Inventors: Chikara Iname, Aki-gun (JP); Yuji Harada, Aki-gun (JP); Hirotsugu Matsuda, Aki-gun (JP); Kenji Uchida, Aki-gun (JP); Masahiro Horikoshi, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

This patent is subject to a terminal disclaimer.

(21) Appl. No.: 19/046,570

(22) Filed: Feb. 6, 2025

(65) Prior Publication Data

US 2025/0264077 A1 Aug. 21, 2025

(30) Foreign Application Priority Data

Feb. 15, 2024 (JP) ................................ 2024-021473

(51) Int. Cl.

*F02M 21/06* (2006.01)
*F02B 75/02* (2006.01)
*F02M 21/02* (2006.01)

(52) U.S. Cl.

CPC ........... *F02M 21/06* (2013.01); *F02B 75/021* (2013.01); *F02M 21/0209* (2013.01); *F02M 21/0239* (2013.01)

(58) Field of Classification Search

CPC .............. F02B 75/021; F02M 21/0239; F02M 21/0209; F02M 21/06

See application file for complete search history.

(56) References Cited

U.S. PATENT DOCUMENTS

2008/0202449 A1 8/2008 Shimada et al.
2014/0158071 A1* 6/2014 Svensson .............. F02B 75/021 123/64
2023/0406701 A1 12/2023 Kiyosawa et al.

FOREIGN PATENT DOCUMENTS

EP 2472079 A1 * 7/2012 ......... F02D 19/0644
EP 2472079 B1 4/2014
JP 2022-104521 A 7/2022
JP 2024-110816 A 8/2024
JP 2024-110818 A 8/2024
JP 2024-110819 A 8/2024

OTHER PUBLICATIONS

Extended European Search Report issued Jul. 16, 2025 in European Patent Application No. 25153457.4.

* cited by examiner

*Primary Examiner* — Kevin A Lathers
(74) *Attorney, Agent, or Firm* — XSENSUS LLP

(57) ABSTRACT

A system and method can include a decomposer to decompose hydrocarbon fuel into carbon and hydrogen gas by using heat and a pressure of combustion gas produced in a combustion chamber, and to separate the hydrogen gas by causing the hydrogen gas to permeate a hydrogen permeable membrane. The decomposer can be adjacent to an intake port in a state of communicating with the intake port via the hydrogen permeable membrane, and can be configured to be able to supply the separated hydrogen gas as fuel to the combustion chamber through the intake port.

9 Claims, 16 Drawing Sheets

FUEL REFORMING SYSTEM FOR VEHICLE

CROSS-REFERENCE TO RELATED APPLICATION

The present application claims priority to Japanese application number 2024-021473, filed in the Japanese Patent Office on Feb. 15, 2024, the entire contents of which are incorporated herein by reference.

TECHNICAL FIELD

The disclosed technique relates to a fuel reforming system for a vehicle on which a reciprocating engine is mounted.

BACKGROUND ART

A device (decomposition device) for directly decomposing a hydrocarbon into carbon and hydrogen is described in Patent Literature 1. This decomposition device includes a reactor in which a catalyst is accommodated. When raw material gas containing hydrocarbons is supplied to the reactor, carbon produced by the reaction of the catalyst adheres to the catalyst. Reaction gas containing hydrogen flows through the reactor.

CITATION LIST

Patent Literature

[Patent Literature 1] JP22022-104521A

SUMMARY

According to one or more aspects, a fuel reforming system for a vehicle, on which a reciprocating engine is mounted, and in the reciprocating engine, a combustion chamber where combustion occurs is partitioned in a cylinder in which a piston reciprocates, can be provided or implemented.

The reciprocating engine can be configured to perform a six-stroke cycle including: an intake stroke in which at least intake air is introduced into the combustion chamber through an intake port by lowering the piston; a compression stroke in which air-fuel mixture containing fuel supplied to the combustion chamber is compressed by raising the piston; an expansion stroke in which the piston is lowered by combustion of the air-fuel mixture; a recompression stroke in which combustion gas is compressed by raising the piston; a re-expansion stroke in which the piston is lowered; and an exhaust stroke in which exhaust gas is discharged through an exhaust port by raising the piston.

The fuel reforming system can include: a decomposer that communicates with the combustion chamber via an openable/closable third port, decomposes hydrocarbon fuel (HC) into carbon and hydrogen gas, and stores the carbon; and a hydrocarbon fuel supply section that supplies the hydrocarbon fuel to the decomposer.

The decomposer can be configured to decompose the hydrocarbon fuel into the carbon and the hydrogen gas by using heat and a pressure of the combustion gas produced in the combustion chamber and to separate the hydrogen gas by causing the hydrogen gas to permeate a hydrogen permeable membrane. In a state of communicating with the intake port via the hydrogen permeable membrane, the decomposer can be disposed adjacent to the intake port, and can be configured to be able to supply the separated hydrogen gas as fuel to the combustion chamber through the intake port.

DETAILED DESCRIPTION OF EMBODIMENTS

Figure 1:
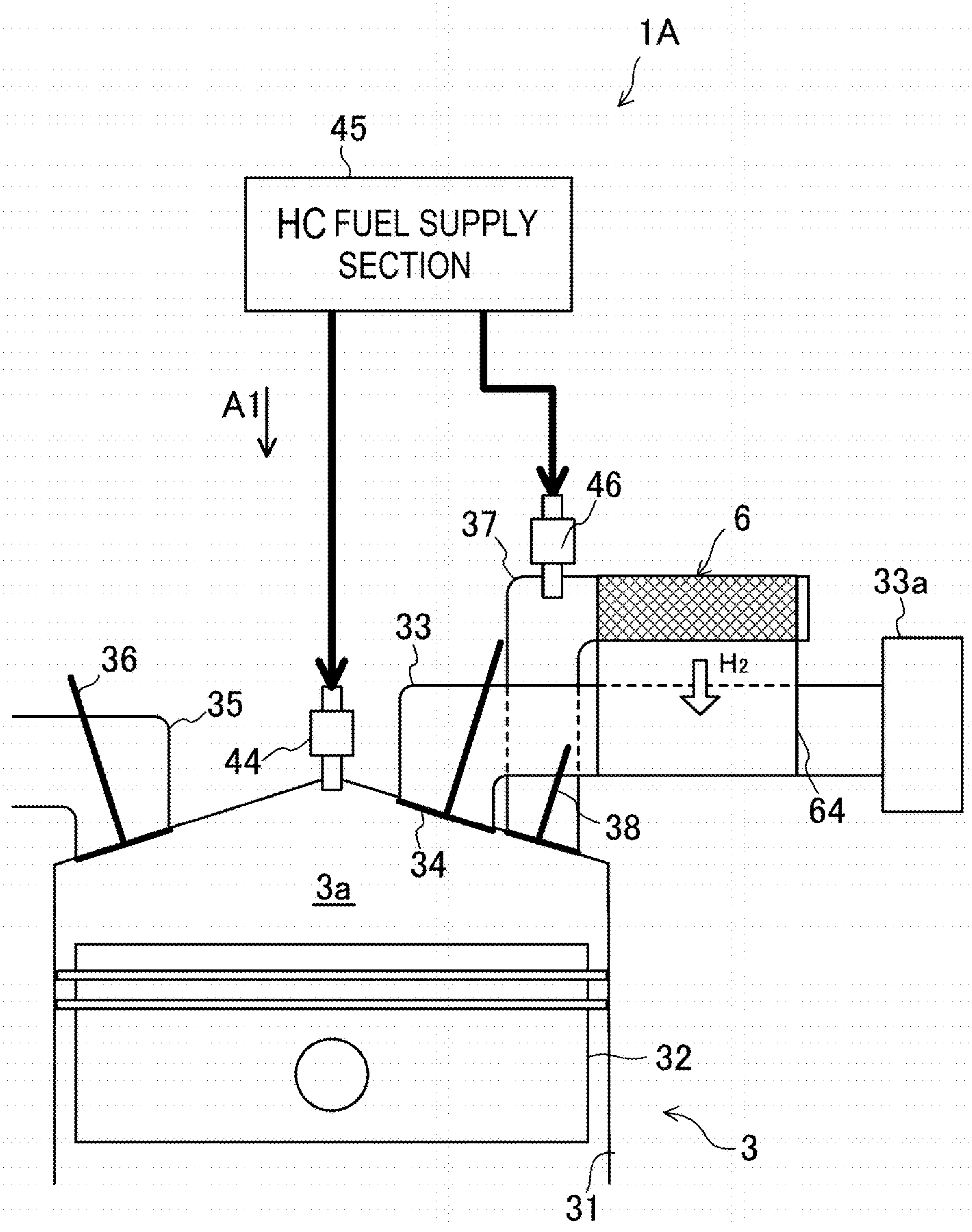
FIG. 1 is a schematic view of a fuel reforming system according to a first embodiment.

In the technical field of vehicles (for example, four-wheeled vehicles), there is a demand for an approach to being carbon neutral. In order to make a vehicle, on which an engine using hydrocarbon (HC) fuel (including gasoline and/or light oil), carbon neutral, there may be a need or desire for a technique of collecting carbon (C) or carbon dioxide (CO2) from the hydrocarbon fuel, in addition to improvement in thermal efficiency of the engine and/or improvement in exhaust emission performance.

In the vehicle, on which the engine using the hydrocarbon fuel is mounted, in order to collect carbon or carbon dioxide, it may be considered to:

(1) collect carbon dioxide after combustion of the hydrocarbon fuel; or (2) decompose the hydrocarbon fuel into carbon and hydrogen gas before combustion of the hydrocarbon fuel and collect carbon.

In consideration that collected carbon dioxide or carbon is stored in the vehicle, (2) may be viewed in terms of fuel economy performance of the vehicle due to a reason that carbon dioxide is heavier than carbon. In addition, in the case of (2), it may also be possible to use the hydrogen gas as the fuel for the engine. It is also noted that when the hydrogen gas is combusted, no carbon oxide may be produced due to the combustion.

Thus, it may be considered to mount the above-described decomposition device onto the vehicle. The decomposition device can include a heater for raising a temperature of the catalyst. Thus, when the decomposition device is mounted on the vehicle, heat of the engine can be used to raise the temperature of the catalyst.

However, when the hydrogen gas is used as the fuel for the engine, a gas tank for storing the hydrogen gas may usually be required. In addition to the gas tank, members such as a gas pipe and a valve may also be required. That is, in order to supply the hydrogen gas to the engine, a system for supplying the hydrogen gas may have to be separately required.

It may be disadvantageous for the vehicle with a limited space to mount such a hydrogen gas supply system. In addition, mounting of such a hydrogen gas supply system on the vehicle can increase vehicle weight.

The technique(s) disclosed herein can be regarded as providing a fuel reforming system suitable for mounting on a vehicle.

That is, a fuel reforming system according to one or more aspects can be used in a vehicle, on which the reciprocating engine performs a specific six-stroke cycle, such as set forth in the preceding paragraph, is mounted. The fuel reforming system according to one or more embodiments can include a decomposer that communicates with the combustion chamber via an openable/closable third port. The decomposer can use the heat and the pressure of the combustion gas produced in the combustion chamber to produce carbon and the hydrogen gas from the hydrocarbon fuel.

Since the heat and the pressure of the combustion gas can be used to produce carbon and the hydrogen gas, a dedicated heater may be undesirable or unnecessary. Thus, the fuel reforming system can be simplified. Produced carbon can be stored in the decomposer. Thus, it can be possible to suppress carbon emission.

The decomposer can be disposed adjacent to the intake port in the state of communicating with the intake port via the hydrogen permeable membrane, and can be configured to be able to supply the separated hydrogen gas as the fuel to the combustion chamber through the intake port.

Accordingly, the produced hydrogen gas can be supplied as the fuel to the combustion chamber through the intake port. Moreover, the hydrogen gas can be directly delivered from the decomposer to the intake port. Thus, there may be no need for attachment of a hydrogen gas supply system such as a gas tank. The fuel reforming system according to one or more embodiments of the present disclosure thus can be very compact and regarded as a relatively simple structure.

Since the decomposer can be located in the vicinity of the combustion chamber, its heat can be easily transferred thereto. Accordingly, it can be possible to promote a reforming reaction and a partial oxidation reaction, in each of which the hydrocarbon fuel is decomposed into carbon and the hydrogen gas. The hydrogen gas can be produced efficiently. According to the disclosed technique(s), a fuel reforming system suitable for mounting on the vehicle can be obtained by using the functions of the reciprocating engine.

According to one or more embodiments, a first injector for injecting the hydrocarbon fuel toward an inside of the third port may be attached to the third port, and, in a latter half of the recompression stroke, the hydrocarbon fuel may be injected from the first injector in an open state of the third port.

Further, in the latter half of the recompression stroke in which the piston is close to top dead center, the pressure of the combustion gas can be regarded as being relatively high. Thus, in the open state of the third port, the high-temperature combustion gas can flow into the third port, and an internal pressure of the decomposer can be increased. Since the hydrocarbon fuel can be injected toward the third port, into which the high-temperature, high-pressure combustion gas flows, the hydrocarbon fuel can be effectively vaporized and dispersed in the combustion gas. In this way, the high-temperature, high-pressure combustion gas in a homogenized state of the hydrocarbon fuel can be introduced into the decomposer.

As a result, the decomposition into carbon and the hydrogen gas can be promoted. Accordingly, the hydrogen gas can be effectively produced.

According to one or more embodiments, the decomposer may have: a case that is installed along the intake port; a reforming member that is accommodated in the case in a manner to extend along the case; and a closed pipe passage that is provided in a central portion of the reforming member and an open end of which communicates with the third port. A second injector for injecting the hydrocarbon fuel from a closed end side of the closed pipe passage toward the closed pipe passage may be attached to the decomposer. In a first half of the recompression stroke, the hydrocarbon fuel may be injected from the second injector in an open state of the third port.

In the first half of the recompression stroke, even in the open state of the third port, the internal pressure of the decomposer can remain relatively low. In this state, when the hydrocarbon fuel is injected from the closed end side of the closed pipe passage toward the closed pipe passage, the hydrocarbon fuel can flow toward the third port through the closed pipe passage. At this time, the combustion gas can flow into the third port while an amount thereof is increased. The hydrocarbon fuel can collide with the combustion gas.

Accordingly, it can be possible to minimize or prevent the hydrocarbon fuel from flowing into the combustion chamber. The hydrocarbon fuel can then be effectively dispersed in the high-temperature combustion gas. In this way, the high-temperature, high-pressure combustion gas in the homogenized state of the hydrocarbon fuel can be introduced into the decomposer.

As a result, the decomposition into carbon and the hydrogen gas can be promoted. Accordingly, the hydrogen gas can be effectively produced.

According to one or more embodiments, the third port may be opened during the re-expansion stroke.

After the hydrocarbon fuel is decomposed into carbon and the hydrogen gas, impure gas such as nitrogen gas may remain in the decomposer. Thus, a relatively large amount of the impure gas can be contained in the gas (residual gas) remaining in the decomposer.

As the amount of the impure gas is increased, an amount of the high-temperature combustion gas for the reforming reaction can be reduced. Thus, such residual gas may interfere with the production of the hydrogen gas. Meanwhile, by opening the third port during the re-expansion stroke, the inside of the decomposer can be scavenged. That is, the residual gas that remains in the decomposer can be reduced.

Since the inside of the decomposer can be scavenged every cycle, hydrogen gas can be produced in the decomposer every cycle. This may also be advantageous for a reduction in pump loss of the engine.

According to one or more embodiments, the decomposer may have a communication passage therein, and the communication passage can communicate between the third port and an intake supply section located on an upstream side of the intake port. A regulation valve capable of blocking a flow from the third port side toward the intake supply section side may be installed between the intake supply section and the communication passage.

For example, when the reciprocating engine is operated in a high-load and high-speed range, filling efficiency may be insufficient. To handle this, with such a configuration, the combustion chamber can communicate with the intake supply section via the communication passage and the third port. That is, the intake air can be introduced into the combustion chamber through these paths, in addition to the intake port. Thus, the filling efficiency can be improved. The insufficient filling efficiency can be compensated.

According to the disclosed technique(s), by using the functions of the reciprocating engine, it can be possible to efficiently produce the hydrogen gas and use the hydrogen gas as the fuel while collecting carbon in the very compact configuration. Therefore, it can be possible to obtain the fuel reforming system suitable for mounting on the vehicle.

The disclosed technique makes use of vehicle-specific functions. In this way, hydrocarbon fuel can be reformed, and hydrogen gas can be effectively used as fuel with a compact structure.

That is, it is possible to obtain a fuel reforming system suitable for mounting on the vehicle. Hereinafter, the disclosed technique will be described in first to third embodiments. However, the following description is merely illustrative in nature.

First Embodiment

Figure 2:
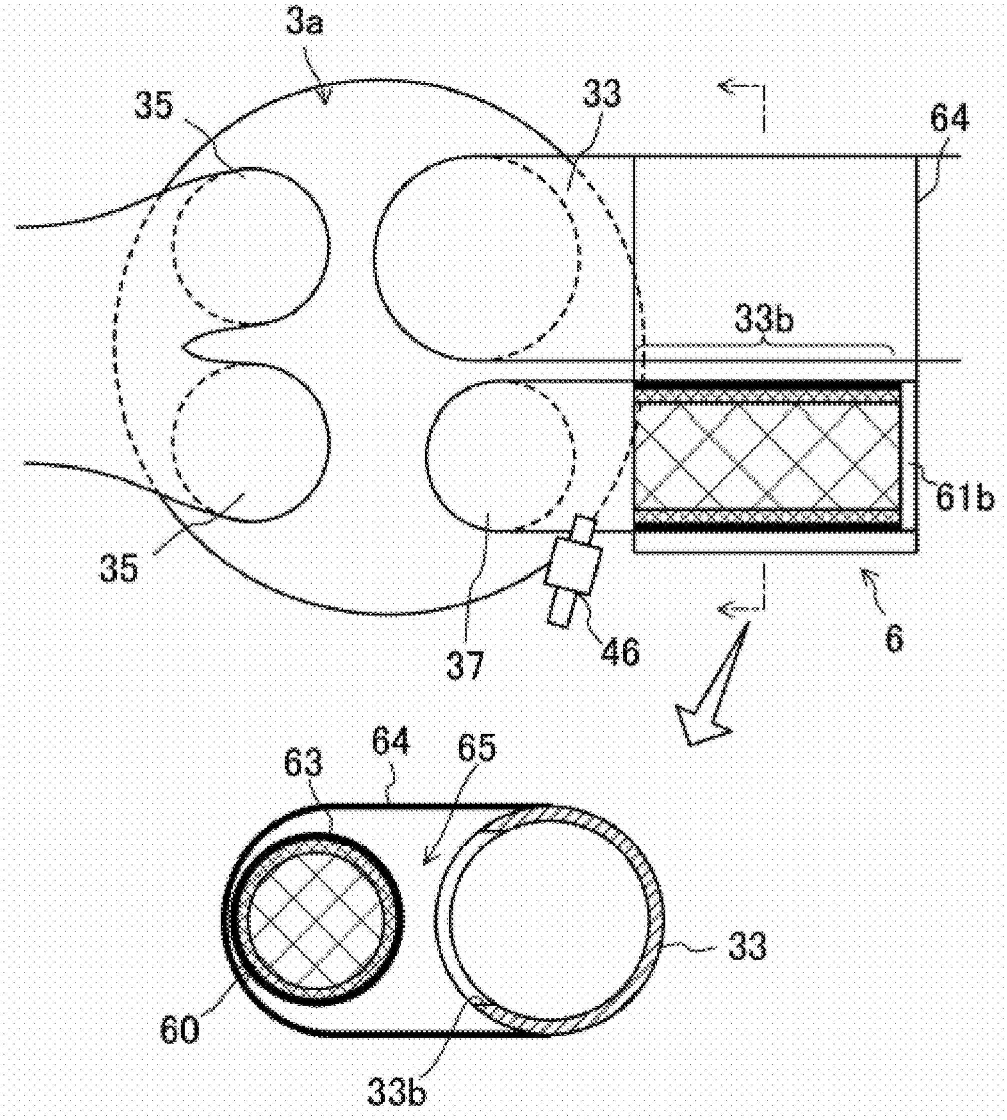
FIG. 2 is a view that is seen from an arrow A1 direction in FIG. 1.

FIG. 1 and FIG. 2 each illustrate an example of a fuel reforming system (first fuel reforming system 1A) mounted on a vehicle. FIG. 2 is a view that is seen from an arrow A1 direction in FIG. 1.

(Configuration of First Fuel Reforming System)

Hydrocarbon fuel is stored in a fuel tank that is mounted on the vehicle. The hydrocarbon fuel is gasoline, for example. The hydrocarbon fuel is not limited to gasoline. The first fuel reforming system 1A decomposes the hydrocarbon fuel into carbon and hydrogen gas.

Carbon is stored in a decomposer 6 described below. The hydrogen gas is used as fuel for a reciprocating engine 3. The first fuel reforming system 1A makes the vehicle, on which the hydrocarbon fuel is mounted, carbon neutral.

The first fuel reforming system 1A includes the reciprocating engine 3 (hereinafter, also simply referred to as the engine 3). The engine 3 includes a cylinder 31 and a piston 32 that reciprocates in the cylinder 31. In an upper end portion of the cylinder 31, a combustion chamber 3*a*, which is partitioned on a lower surface by the piston 32, is formed. The engine 3 includes the plural cylinders 31.

The plural cylinders 31 are arranged in a direction in which a crankshaft of the engine 3 extends, for example. The piston 32 in each of the cylinders 31 is connected to the crankshaft via a connecting rod. The connecting rod converts reciprocating motion of the piston 32 into rotation of the crankshaft. The crankshaft is connected to drive wheels via a transmission. The engine 3 outputs a driving force for travel of the vehicle.

The engine 3 has an intake port 33. The intake port 33 communicates with the upper portion of the cylinder 31, that is, the combustion chamber 3*a*. Each of the cylinders 31 has the single intake port 33. The intake port 33 of each of the cylinders is connected to an intake manifold 33*a* (an example of the intake supply section) located on an upstream side thereof.

Fresh air (outside air) is distributed and supplied from the intake manifold 33*a* to each of the intake ports 33. As will be described below, the fresh air is introduced into each of the combustion chambers 3*a* through the respective intake port 33. Thus, the intake air at least contains the fresh air. The intake air may contain exhaust gas recirculation (EGR) gas. As will be described below, in this engine 3, the intake air may contain the hydrogen gas.

The engine 3 includes an intake valve 34. The intake valve 34 is a poppet valve that opens/closes the intake port 33. When the intake valve 34 is opened, the intake air is introduced into the combustion chamber 3*a*. An intake valve train 41 illustrated in FIG. 4 opens/closes the intake valve 34. The intake valve train 41 includes an intake camshaft that is mechanically connected to the intake valve 34, for example.

The intake valve train 41 can continuously change valve timing of the intake valve 34 (so-called sequential-valve timing (S-VT)). The intake valve train 41 can also continuously change a valve lift of the intake valve 34 (so-called continuously variable valve lift (CVVL)). As the intake valve train 41, a known hydraulic or electric mechanism can be employed. The intake valve train 41 changes the valve timing and/or the valve lift according to an operating state of the engine 3.

The engine 3 has an exhaust port 35. The exhaust port 35 communicates with the combustion chamber 3*a*. Each of the cylinders 31 has the two exhaust ports 35. The single exhaust port 35 may be provided. The exhaust port 35 is connected to an exhaust pipe. As will be described below, exhaust gas is discharged from the combustion chamber 3*a* through the exhaust port 35.

The engine 3 has an exhaust valve 36. The exhaust valve 36 is a poppet valve that opens/closes the exhaust port 35. When the exhaust valve 36 is opened, the exhaust gas is discharged to the outside of the cylinder 31. An exhaust valve train 42 illustrated in FIG. 4 opens/closes the exhaust valve 36. The exhaust valve train 42 has an exhaust camshaft that is mechanically connected to the exhaust valve 36, for example.

The exhaust valve train 42 can continuously change valve timing of the exhaust valve 36 (so-called S-VT). The exhaust valve train 42 can also continuously change a valve lift of the exhaust valve 36 (so-called CVVL). As the exhaust valve train 42, a known hydraulic or electric mechanism can be employed. The exhaust valve train 42 changes the valve timing and/or the valve lift according to the operating state of the engine 3.

The engine 3 has a third port 37. The third port 37 communicates with the combustion chamber 3*a*. Each of the cylinders 31 has the single third port 37.

The third port 37 is adjacent to the intake port 33 and extends along the intake port 33. The third port 37 has an inner diameter that is equal to or smaller than an inner diameter of the intake port 33. In order to facilitate understanding, in FIG. 1, the exhaust port 35 and the third port 37 are illustrated in an offset manner.

The engine 3 has an on-off valve 38. The on-off valve 38 is a poppet valve that opens/closes the third port 37. A third valve train 43 illustrated in FIG. 4 opens/closes the on-off valve 38. The third valve train 43 has a third camshaft that is mechanically connected to the on-off valve 38, for example.

The third valve train 43 can continuously change valve timing and a valve lift of the on-off valve 38. That is, the third valve train 43 can change the valve timing and/or the valve lift according to the operating state of the engine 3.

However, in a six-stroke cycle described below, as basic operation, the third valve train 43 opens the on-off valve 38 twice in one cycle.

The third valve train 43 can stop opening/closing of the on-off valve 38. As a valve stopping mechanism for stopping opening/closing of the on-off valve 38, a known hydraulic or electric mechanism can be employed. The valve stopping mechanism may be incorporated into a rocker arm that is interposed between the third camshaft and the on-off valve 38, for example. Alternatively, the valve stopping mechanism may be incorporated into a lash adjuster that supports the rocker arm. The on-off valve 38 may be mechanically connected to the intake camshaft or the exhaust camshaft.

A direct injection injector 44 is attached to the engine 3. An injection hole of the direct injection injector 44 faces the combustion chamber 3*a*. The direct injection injector 44 is connected to a hydrocarbon fuel supply section 45. The hydrocarbon fuel supply section 45 includes a fuel tank for storing the hydrocarbon fuel and a fuel pump for pumping the hydrocarbon fuel. The hydrocarbon fuel supply section 45 supplies the hydrocarbon fuel to the direct injection injector 44. The direct injection injector 44 injects the hydrocarbon fuel as fuel into the combustion chamber 3*a*.

A reforming injector 46 is attached to the third port 37. The reforming injector 46 herein corresponds to the first injector. An injection hole of the reforming injector 46 faces the inside of the third port 37. The reforming injector 46 is also connected to the hydrocarbon fuel supply section 45. The hydrocarbon fuel supply section 45 supplies the hydrocarbon fuel into the reforming injector 46. The reforming injector 46 injects the hydrocarbon fuel to be reformed (fuel to be reformed) toward the inside of the third port 37.

(Decomposer)

The decomposer 6 is connected to the third port 37. The decomposer 6 communicates with the combustion chamber 3*a* via the third port 37.

The decomposer 6 decomposes the hydrocarbon fuel into carbon and the hydrogen gas. The decomposer 6 is attached to each of the cylinders 31. In a state of communicating with the intake port 33 via a hydrogen permeable membrane 63 described below, the decomposer 6 is disposed adjacent to the intake port 33. Accordingly, the decomposer 6 is configured to be able to supply the separated hydrogen gas as the fuel to the combustion chamber 3*a* through the intake port 33.

Figure 3:
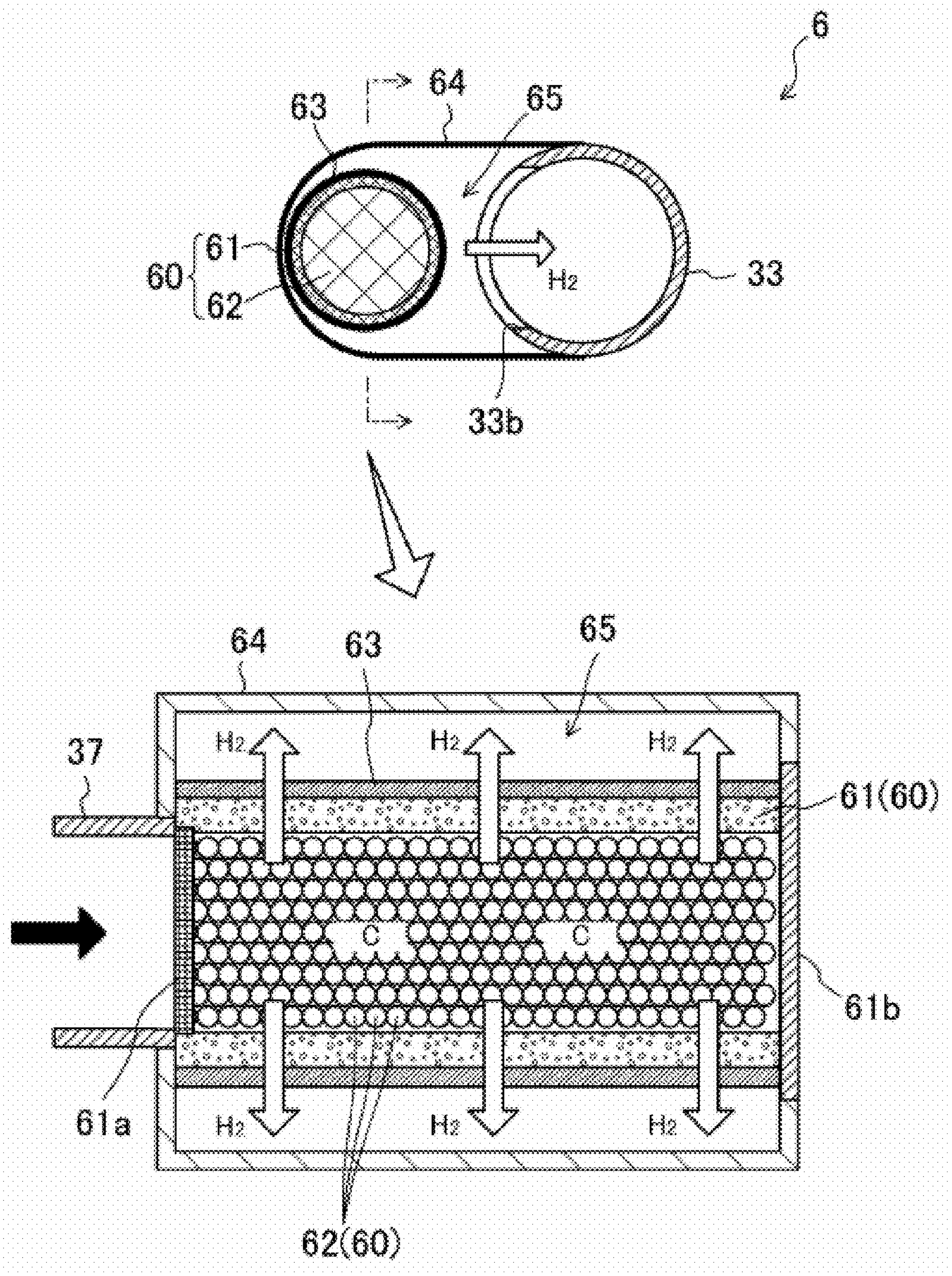
FIG. 3 is a schematic view of a decomposer.

FIG. 3 illustrates a structure of the decomposer 6. The decomposer 6 produces the hydrogen gas by a reforming reaction. By using a catalyst, the decomposer 6 decomposes the hydrocarbon fuel into carbon and the hydrogen gas at a high temperature at which the decomposer 6 can be practically used in the vehicle. Then, the hydrogen gas is separated by permeating the hydrogen permeable membrane 63.

The decomposer 6 is a so-called membrane reactor. The decomposition of the hydrocarbon fuel such as isooctane is expressed by the following chemical reaction formula:

$$iC8H18(g)=8C(s)+9H2$$

Collection of carbon as a solid suppresses an increase in vehicle weight. The first fuel reforming system 1A is suitable as an in-vehicle system.

The decomposer 6 includes a reforming member 60. The reforming member 60 may be regarded as a reformer and can include a cylindrical support body 61 and a ball-shaped carrier 62. The hydrogen permeable membrane 63 is supported on the outside of the support body 61 (the hydrogen permeable membrane 63 may be supported on the inside of the support body 61).

A net 61*a* for catching the carrier 62 is attached to an opening of the support body 61. The inside of the support body 61 communicates with the third port 37 through the net 61*a*. Meanwhile, the other opening of the support body 61 is sealed with a lid body 61*b*.

As the carrier 62, an aluminum oxide ball can be used, for example. The catalyst is applied to a surface of the carrier 62. An example of the catalyst that can be used to decompose the hydrocarbon fuel is Ni—Al—Fe alloy. Any of various types of the catalysts can be used as long as the catalyst can be used to decompose the hydrocarbon fuel.

The support body 61 is filled with a large number of the carriers 62. Use of the balls as the carriers 62 increases a surface area of the catalyst and improves decomposition performance of the decomposer 6. A shape of the carrier 62 is not limited to a specific shape.

Carbon produced by the decomposition of the hydrocarbon fuel adheres to the surface of the carrier 62. The decomposer 6 also stores carbon. By using the balls, a carbon storage amount in the decomposer 6 is increased. In addition, even when the carbon storage amount is increased, the decomposition performance of the decomposer 6 can be maintained for a long time. Furthermore, the use of the balls facilitates the separation of the hydrogen gas decomposed from the hydrocarbon fuel. As will be described below, the efficient separation of the hydrogen gas also suppresses degradation of the decomposition performance of the decomposer 6.

The support body 61 is made of porous ceramic, for example. The porous ceramic is zirconia, for example. The support body 61 has a function of accommodating the carriers 62 of the catalyst described below and a function of holding the hydrogen permeable membrane 63.

The hydrogen permeable membrane 63 is attached to an outer circumferential surface of the support body 61. The hydrogen permeable membrane 63 is a Pd alloy film, for example. The hydrogen permeable membrane 63 has pores in a molecular size and selectively allows the hydrogen gas to permeate. The hydrogen gas that is produced in the support body 61 permeates the hydrogen permeable membrane 63 and reaches the outside of the reforming member 60 (see blank arrows in FIG. 3). Impure gas, such as nitrogen gas, other than the hydrogen gas remains inside the support body 61. The reforming member 60 can adopt any of various structures.

The decomposer 6 has a case 64. The case 64 is installed in a manner to extend along the intake port 33. The reforming member 60 is accommodated in the case 64. A part of the intake port 33 is also accommodated in the case 64. Thus, the part of the intake port 33 and the reforming member 60 are located in a sealed communication space 65.

The intake port 33 has an opening 33*b* that faces the communication space 65. The opening 33*b* is formed to extend along the reforming member 60. The opening 33*b* may have a large number of holes. In short, the opening 33*b* only needs to allow the hydrogen gas to flow from the communication space 65 to the inside of the intake port 33.

A space constituting the communication space 65 is provided between the outer circumferential surface of the reforming member 60 and an inner circumferential surface of the case 64. The case 64 guides the hydrogen gas to the inside of the intake port 33 through the opening 33*b*.

The third port 37 is connected to an end portion of the case 64. In detail, the third port 37 is connected to one end of the cylindrical support body 61 and communicates with the inside thereof. Combustion gas produced in the combustion chamber 3*a* and the fuel to be reformed (hydrocarbon fuel)

injected from the reforming injector 46 are introduced into the support body 61 and the hydrogen permeable membrane 63 through the third port 37 (see a black arrow in FIG. 3). In the support body 61, the hydrocarbon fuel is decomposed into carbon and the hydrogen gas.

The hydrogen gas that has permeated the hydrogen permeable membrane 63 flows into the intake port 33 through the communication space 65 (see the blank arrows in FIGS. 1 and 3). The hydrogen gas that has flowed into the intake port 33 is supplied to the combustion chamber 3*a* through the intake port 33 and is used as the fuel.

(Controller)

Figure 4:
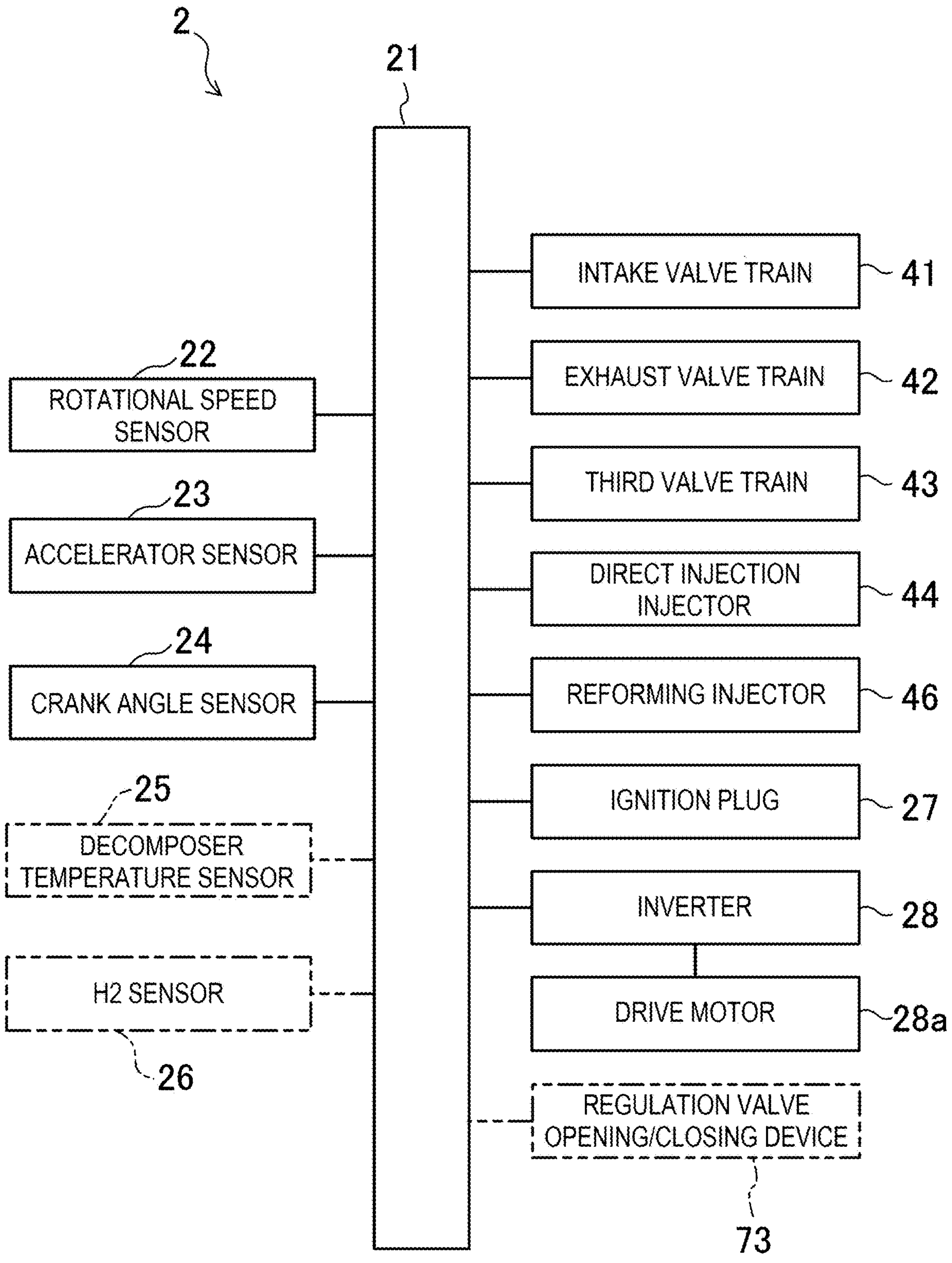
FIG. 4 is a block diagram of a control system.

FIG. 4 is a block diagram of a control system 2 mounted on the vehicle. The first fuel reforming system 1A cooperates with this control system 2. The first fuel reforming system 1A and the control system 2 share devices when necessary. The control system 2 includes a controller 21. The controller 21 includes: hardware such as a processor, memory, and an interface; and software such as a database and a control program.

A rotational speed sensor 22 is electrically connected to the controller 21. The rotational speed sensor 22 is attached to the engine 3. The rotational speed sensor 22 outputs a measurement signal corresponding to a rotational speed of the crankshaft to the controller 21. The controller 21 obtains a speed of the engine 3 based on the measurement signal of the rotational speed sensor 22.

An accelerator sensor 23 is electrically connected to the controller 21. The accelerator sensor 23 is attached to an accelerator pedal. The accelerator sensor 23 outputs a signal corresponding to a depression amount of the accelerator pedal to the controller 21. The controller 21 obtains a required load of the engine 3 based on the measurement signal from the accelerator sensor 23.

A crank angle sensor 24 is electrically connected to the controller 21. The crank angle sensor 24 is attached to the engine 3. The crank angle sensor 24 outputs a signal corresponding to an angle of the crankshaft to the controller 21. The controller 21 obtains a position of the piston 32 in each of the cylinders 31 based on the signal of the crank angle sensor 24.

The intake valve train 41, the exhaust valve train 42, and the third valve train 43 are electrically connected to the controller 21. The controller 21 outputs a control signal to each of the intake valve train 41, the exhaust valve train 42, and the third valve train 43 according to the operating state of the engine 3. The intake valve train 41 changes the valve timing and/or the valve lift of the intake valve 34 based on the control signal from the controller 21 including the signal from the crank angle sensor 24.

Similarly, the exhaust valve train 42 changes the valve timing and/or the valve lift of the exhaust valve 36 based on the control signal from the controller 21. The third valve train 43 also switches between opening/closing and stopping of the on-off valve 38 based on the control signal from the controller 21. Then, the third valve train 43 changes the valve timing and/or the valve lift of the on-off valve 38 when necessary.

The direct injection injector 44 and the reforming injector 46 described above are each electrically connected to the controller 21. The controller 21 outputs a control signal to the direct injection injector 44 and the reforming injector 46.

The direct injection injector 44 injects a predetermined amount of the hydrocarbon fuel into the combustion chamber 3*a* at predetermined timing based on the control signal from the controller 21. The reforming injector 46 injects a predetermined amount of the fuel to be reformed into the third port 37 at predetermined timing based on the control signal from the controller 21.

The control system 2 has a spark plug 27, which may be regarded or referred to as an ignition plug 27. The spark plug 27 is attached to the engine 3 in a manner to face the combustion chamber 3*a*. The spark plug 27 is electrically connected to the controller 21. The controller 21 outputs a control signal to the spark plug 27. The spark plug 27 ignites air-fuel mixture in the combustion chamber 3*a* at predetermined timing based on the control signal from the controller 21.

The control system 2 includes an inverter 28. The vehicle includes a drive motor 28*a* (assist motor) that outputs the driving force for travel of the vehicle. The inverter 28 controls the drive motor 28*a* thereof. The inverter 28 is electrically connected to the controller 21. The controller 21 outputs a control signal to the inverter 28 when output of the engine 3 is insufficient. As a result, the drive motor 28*a* is actuated to assist with the operation of the engine 3.

A decomposer temperature sensor 25, a hydrogen gas sensor 26, and a regulation valve opening/closing device 73, each of which is indicated by an imaginary line in FIG. 4, are devices related to embodiments described below. Thus, these will be described below.

(Operation of Reciprocating Engine)

Figure 5:
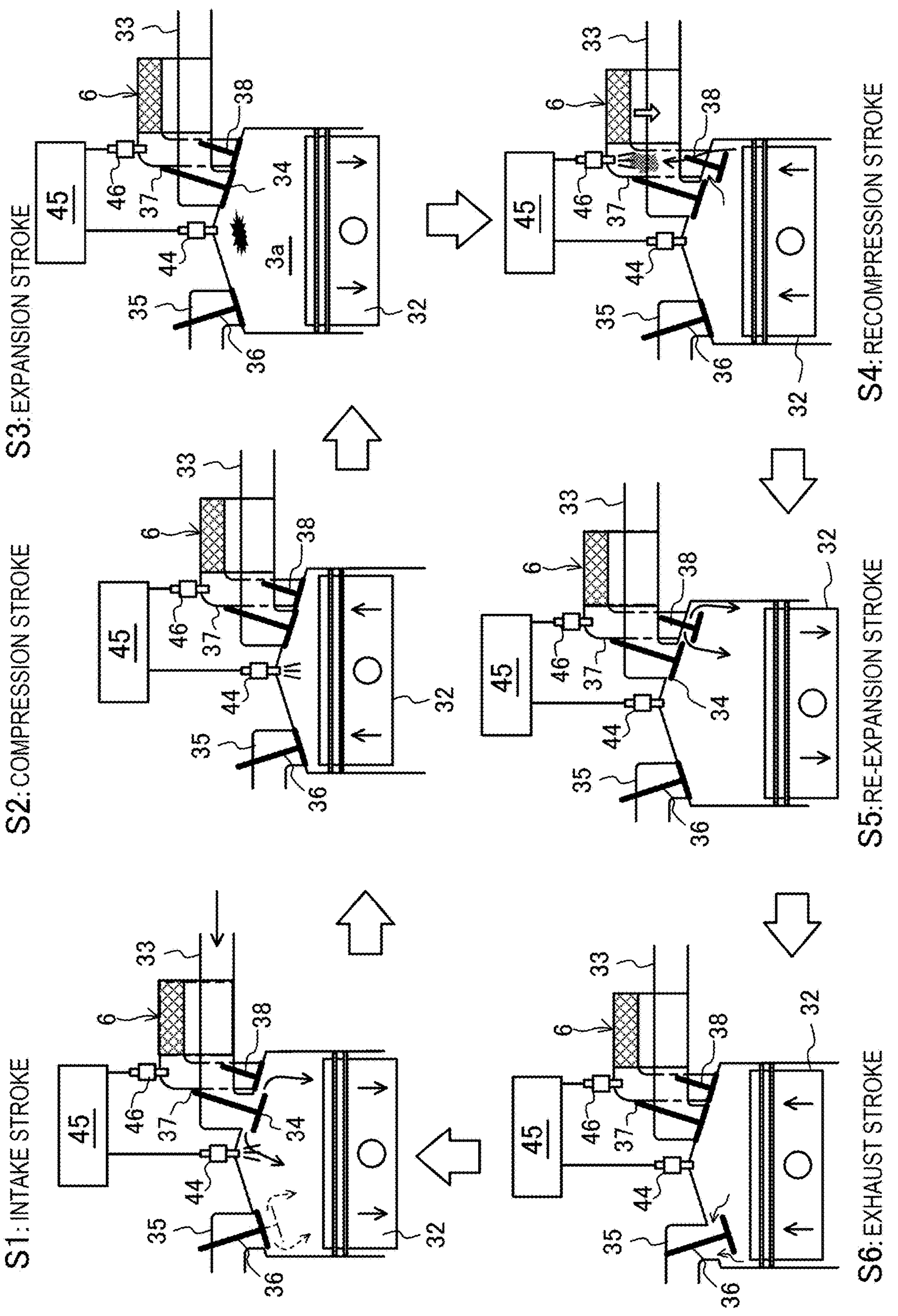
FIG. 5 is a view illustrating a six-stroke cycle.
Figure 6:
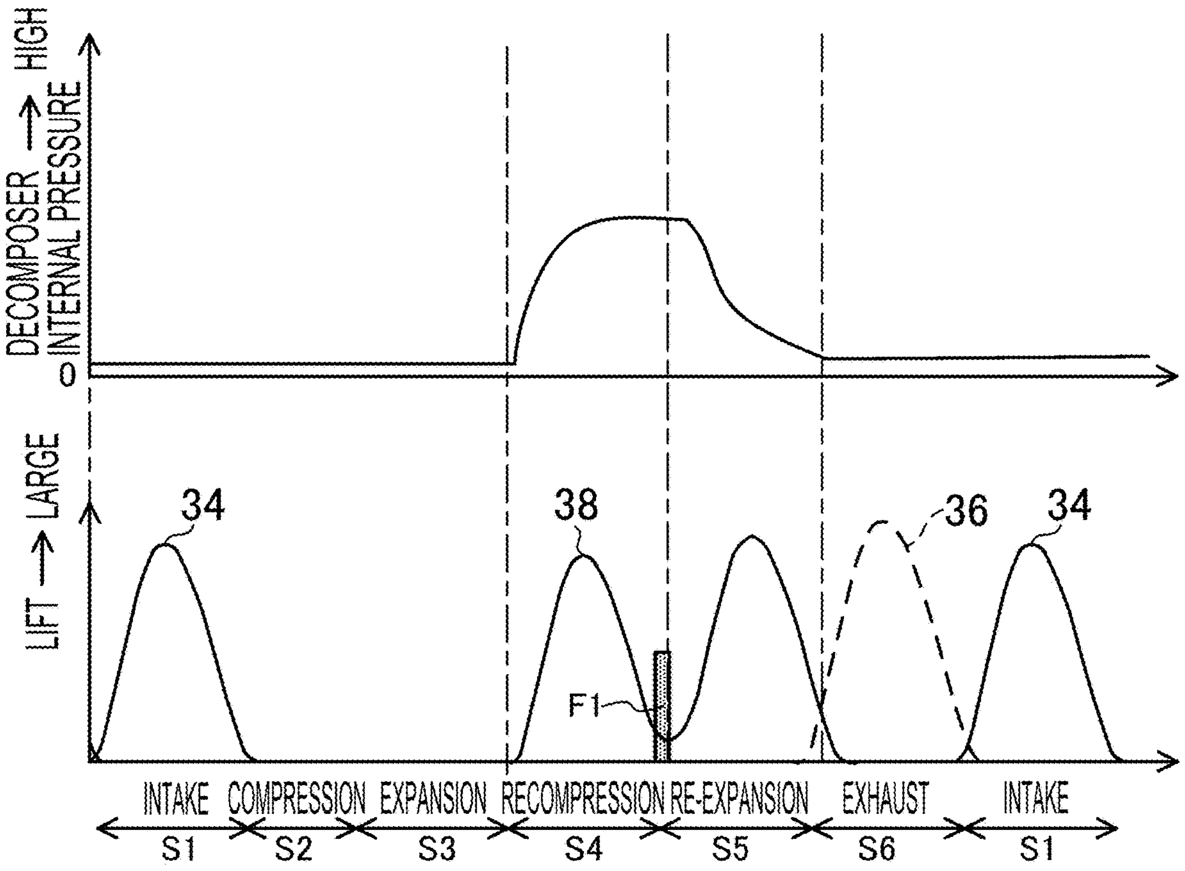
FIG. 6 illustrates examples of operation of each valve, injection timing of fuel to be reformed, and a change in an internal pressure of the decomposer.

The engine 3 performs a six-stroke cycle in order for the decomposer 6 to decompose the hydrocarbon fuel. FIG. 5 illustrates an example of each stroke in the six-stroke cycle. FIG. 6 illustrates examples of the valve timing and the valve lift of each of the valves, the injection timing of the fuel to be reformed, and a change in an internal pressure of the decomposer 6 in the six-stroke cycle.

S1 is an intake stroke. In the intake stroke S1, the engine 3 introduces the intake air into the combustion chamber 3*a* by lowering the piston 32. In the intake stroke S1, the intake valve 34 is opened. The intake air is introduced into the combustion chamber 3*a* through the intake port 33.

The intake air at least contains the fresh air. As will be described below, the intake air may contain the hydrogen gas. When the intake air containing the hydrogen gas is introduced in the combustion chamber 3*a*, the hydrogen gas is used as the fuel. In the engine 3, by using the hydrogen gas, the hydrocarbon fuel as the fuel can be reduced or does not have to be used.

The intake air may contain the EGR gas. The EGR gas is so-called external EGR gas that is recirculated into an intake pipe through an EGR passage. As indicated by an imaginary line in FIG. 5, the exhaust valve 36 may be opened in the intake stroke S1. When the exhaust valve 36 is opened, the exhaust gas is introduced into the combustion chamber 3*a* through the exhaust port 35.

The exhaust gas that is introduced into the combustion chamber 3*a* is so-called internal EGR gas. An amount of the internal EGR gas in the combustion chamber 3*a* is adjusted according to a magnitude of the load of the engine 3. For example, the amount of the internal EGR gas is adjusted such that, as the load on the engine 3 is increased, the amount of the internal EGR gas in the combustion chamber 3*a* is reduced. As a result, an amount of the intake air (fresh air) introduced into the combustion chamber 3*a* is increased.

The engine 3 outputs power corresponding to a request by adjusting the amount of the internal EGR gas (and the amount of the fresh air). In the intake stroke S1, the on-off valve 38 of the third port 37 is closed.

In the example of FIG. 5, the direct injection injector 44 injects the hydrocarbon fuel into the combustion chamber 3*a* during the intake stroke S1. The direct injection injector 44 may inject hydrocarbon fuel during a compression stroke S2. The direct injection injector 44 may inject the hydrocarbon fuel in a period from the intake stroke S1 to the compression stroke S2. By injection of the hydrocarbon fuel, the air-fuel mixture is produced in the combustion chamber 3*a*.

S2 is the compression stroke following the intake stroke S1. In the compression stroke S2, the engine 3 compresses the air-fuel mixture in the combustion chamber 3*a* by raising the piston 32. In the compression stroke S2, the intake valve 34, the exhaust valve 36, and the on-off valve 38 are all closed.

The spark plug 27 ignites the air-fuel mixture in the combustion chamber 3*a* at timing near compression top dead center. The air-fuel mixture starts combustion. S3 is an expansion stroke following the compression stroke S2. In the expansion stroke S3, the piston 32 is lowered by the combustion of the air-fuel mixture. In the expansion stroke S3, the intake valve 34, the exhaust valve 36, and the on-off valve 38 are all closed.

S4 is a recompression stroke following the expansion stroke S3. In the recompression stroke S4, the engine 3 compresses combustion gas in the combustion chamber 3*a* by raising the piston 32. In the recompression stroke S4, the on-off valve 38 is opened. The intake valve 34 and the exhaust valve 36 are closed. In this way, the compressed combustion gas is introduced into the decomposer 6 through the third port 37.

Furthermore, according to the operating state of the engine 3, the reforming injector 46 injects the fuel to be reformed toward the inside of the third port 37 in the recompression stroke S4. More specifically, as indicated by a reference sign F1 in FIG. 6, the reforming injector 46 injects the fuel to be reformed in a latter half of the recompression stroke S4.

In the recompression stroke S4, a pressure of the combustion gas is increased over time. The internal pressure of the decomposer 6 is lower than an internal pressure of the combustion chamber 3*a*. Accordingly, the high-temperature combustion gas flows from the combustion chamber 3*a* into the decomposer 6 while the gas stored in the decomposer 6 is compressed. Then, in a latter half of the recompression stroke S4, a differential pressure is low, and the high-temperature, high-pressure combustion gas flows into the decomposer 6.

In this state, since the fuel to be reformed is injected toward the third port 37, into which the high-pressure combustion gas flows, the fuel to be reformed can be effectively dispersed in the combustion gas even when the third port 37 is narrow. In this way, the high-temperature, high-pressure combustion gas in a state where the fuel to be reformed is homogenized is introduced into the decomposer 6.

As described above, in the decomposer 6, the hydrocarbon fuel is decomposed into carbon and the hydrogen gas by the heat of the combustion gas and the catalyst. Since the fuel to be reformed is homogenized, the fuel to be reformed can efficiently contact the catalyst. Doe to the high temperature and the high pressure, the reforming reaction can be promoted. Accordingly, the hydrogen gas can be effectively produced.

Carbon is stored in the decomposer 6. The hydrogen gas permeates the hydrogen permeable membrane 63 by an internal pressure difference between the decomposer 6 and the intake port 33 (the internal pressure of the decomposer 6>the internal pressure of the intake port 33). The hydrogen gas that has permeated the hydrogen permeable membrane 63 is delivered to the intake port 33 via the communication space 65. The hydrogen gas that has been delivered to the intake port 33 is stored in the intake port 33.

Since the high pressure of the combustion gas in the recompression stroke S4 acts inside the decomposer 6, the produced hydrogen gas rapidly permeates the hydrogen permeable membrane 63. Since the hydrogen gas inside the decomposer 6 is reduced, the decomposition of the fuel to be reformed is promoted.

Moreover, the decomposer 6 is integrally formed with the intake port 33 and the third port 37, which are located in the vicinity of the combustion chamber 3*a* at the high temperature and communicate with the combustion chamber 3*a*. Accordingly, the heat of the combustion chamber 3*a* is easily transferred to the decomposer 6, and thus, the heat can also be effectively used. For this reason, the decomposer 6 can efficiently produce a relatively large amount of the hydrogen gas even in a small size.

S5 is a re-expansion stroke following the recompression stroke S4. In the re-expansion stroke S5, the intake valve 34 and the exhaust valve 36 are closed. Then, the piston 32 is lowered. The on-off valve 38 is opened in the re-expansion stroke S5. When the on-off valve 38 is opened, the combustion gas stored in the decomposer 6 is suctioned and flows into the combustion chamber 3*a*.

After the recompression stroke S4, residual gas remains in the decomposer 6. The residual gas contains a large amount of the impure gas such as the nitrogen gas. That is, in the decomposer 6, the hydrogen gas and carbon are removed from the combustion gas due to the decomposition by the catalyst and the separation by the hydrogen permeable membrane 63. Meanwhile, the impure gas such as the nitrogen gas remains as is. Accordingly, a relatively large amount of the impure gas such as the nitrogen gas is contained in the residual gas remaining in the decomposer 6.

As the amount of the impure gas is increased, an amount of the high-temperature combustion gas required for the reforming reaction is reduced. The residual gas thus interferes with the production of the hydrogen gas. By opening the third port 37 during the re-expansion stroke S5, the inside of the decomposer 6 can be scavenged. That is, the amount of the residual gas remaining in the decomposer 6 can be reduced.

Since the inside of the decomposer 6 can be scavenged every cycle, the hydrogen gas can be produced in the decomposer 6 every cycle. In addition, opening of the on-off valve 38 in the re-expansion stroke S5 is advantageous in reducing pump loss of the engine 3.

S6 is an exhaust stroke following the re-expansion stroke S5. In the exhaust stroke S6, the engine 3 discharges the combustion gas in the combustion chamber 3*a* through the exhaust port 35 by raising the piston 32. In the exhaust stroke S6, the exhaust valve 36 is opened. The combustion gas in the combustion chamber 3*a* (including the residual gas scavenged from the decomposer 6) is discharged to the exhaust port 35. In the exhaust stroke S6, the intake valve 34 and the on-off valve 38 are closed.

After the exhaust stroke S6, the engine 3 returns to the intake stroke S1. In the intake stroke S1, when the intake valve 34 is opened, the intake air containing the hydrogen gas is introduced into the combustion chamber 3*a* through the intake port 33. When the intake air containing the hydrogen gas is introduced into the combustion chamber 3*a*, as described above, the hydrogen gas is used as the fuel. In this engine, with use of the hydrogen gas, the amount of the hydrocarbon fuel as the fuel can be reduced, or the use of the hydrocarbon fuel can be avoided.

At a boundary between the intake stroke S1 and the exhaust stroke S6, the timing at which the intake valve 34 is closed and the timing at which the exhaust valve 36 is opened slightly overlap each other around the top dead center. So-called valve overlap occurs. Similarly, at a boundary between the re-expansion stroke S5 and the exhaust stroke S6, timing at which the on-off valve 38 is closed and timing at which the exhaust valve 36 is opened slightly overlap each other around the bottom dead center.

The first fuel reforming system 1A stores carbon produced by the decomposition of the hydrocarbon fuel in the decomposer 6. Then, the hydrogen gas produced by the decomposition of the hydrocarbon fuel is combusted in the engine 3. Thus, no carbon oxide is produced by the combustion. The first fuel reforming system 1A can become carbon neutral.

The first fuel reforming system 1A also decomposes the hydrocarbon fuel by using the heat and the pressure generated by the engine 3. Accordingly, a separate dedicated device is not required. In addition, the decomposer 6 is adjacent to the intake port 33, and the produced hydrogen gas is immediately delivered to the intake port 33. In the intake stroke S1, the hydrogen gas is introduced into the combustion chamber 3*a* in the state of being contained in the intake air. Thus, the hydrogen gas can be efficiently supplied as the fuel to the combustion chamber 3*a* with the very simple configuration. The first fuel reforming system 1A is useful as the in-vehicle system.

When the storage amount of carbon in the decomposer 6 is increased, carbon is collected from the decomposer 6. For example, at the time of bringing the vehicle into a shop for maintenance, the carrier 62 to which carbon has adhered is taken out from the decomposer 6, and carbon is removed from the carrier 62 by using a mill, for example. Collected carbon can be used as industrial carbon. The carrier 62 from which carbon has been removed can be stored in the decomposer 6 after the catalyst is reapplied thereto when necessary.

In the six-stroke cycle, the injection of the hydrocarbon fuel from the direct injection injector 44 is not essential. For example, while the vehicle is decelerated, the hydrocarbon fuel may not be injected from the direct injection injector 44 (so-called fuel cut). In addition, in the case where combustion energy of the hydrogen gas contained in the intake air is sufficient for the required output for the engine 3, the hydrocarbon fuel may not be injected from the direct injection injector 44.

On the other hand, in the case where a high load is required for the engine 3, or the hydrogen gas as the fuel is not required for the engine 3, operation in a normal four-stroke cycle may be performed. That is, the operation in which the recompression stroke S4 and the re-expansion stroke S5 are omitted from the six-stroke cycle described above may be performed.

Specific Example of Control by First Fuel Reforming System

Figure 7:
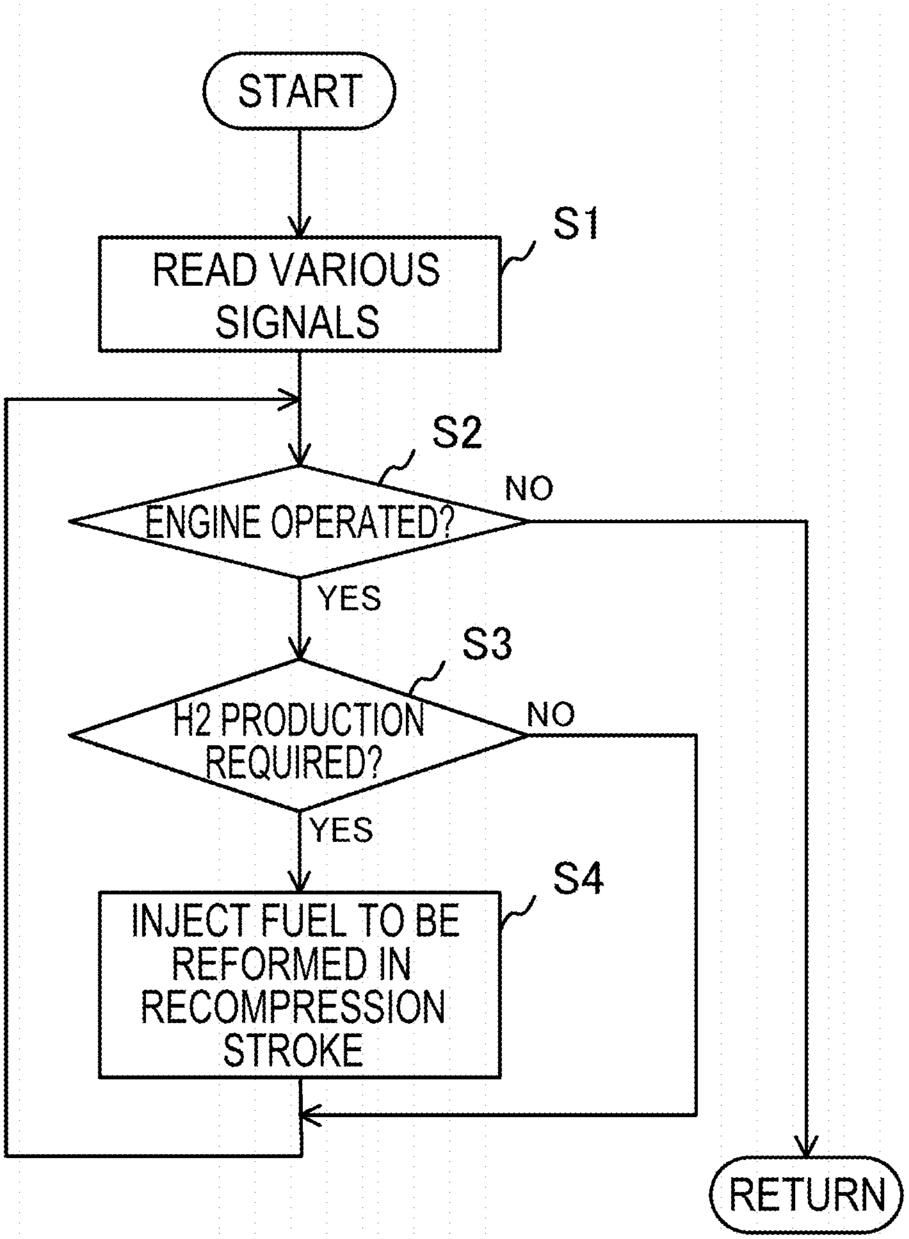
FIG. 7 is a flowchart of control by a first fuel reforming system.

FIG. 7 illustrates an example of control by the first fuel reforming system 1A. It is assumed that the engine 3 performs the combustion in the above-described six-stroke cycle.

The controller 21 reads the various signals input from the accelerator sensor 23 and the like (step S1). During the operation of the engine 3, the controller 21 identifies the output required for the engine 3 based on the read signals, and executes the operation in the above-described six-stroke cycle (Yes in step S2). Then, with termination of the operation of the engine 3, the control by the controller 21 is also terminated (No in step S2).

During the operation of the engine 3, the controller 21 determines whether to produce the hydrogen gas from the required output for the engine 3, the operating state of the engine 3, and the like (step S3).

As a result, when determining that the hydrogen gas has to be produced, as illustrated in FIG. 6, the controller 21 injects the fuel to be reformed in the latter half of the recompression stroke S4 (step S4). The produced amount of the hydrogen gas can be controlled based on the injection amount of the fuel to be reformed, the temperature of the decomposer 6, and the like. The controller 21 adjusts the injection amount of the fuel to be reformed according to the operating state of the engine 3.

On the other hand, when determining that the production of the hydrogen gas is unnecessary, the controller 21 does not inject the fuel to be reformed. The consumption of the hydrocarbon fuel can be suppressed. During the operation of the engine 3, the controller 21 repeats such processing.

Second Embodiment

Figure 8:
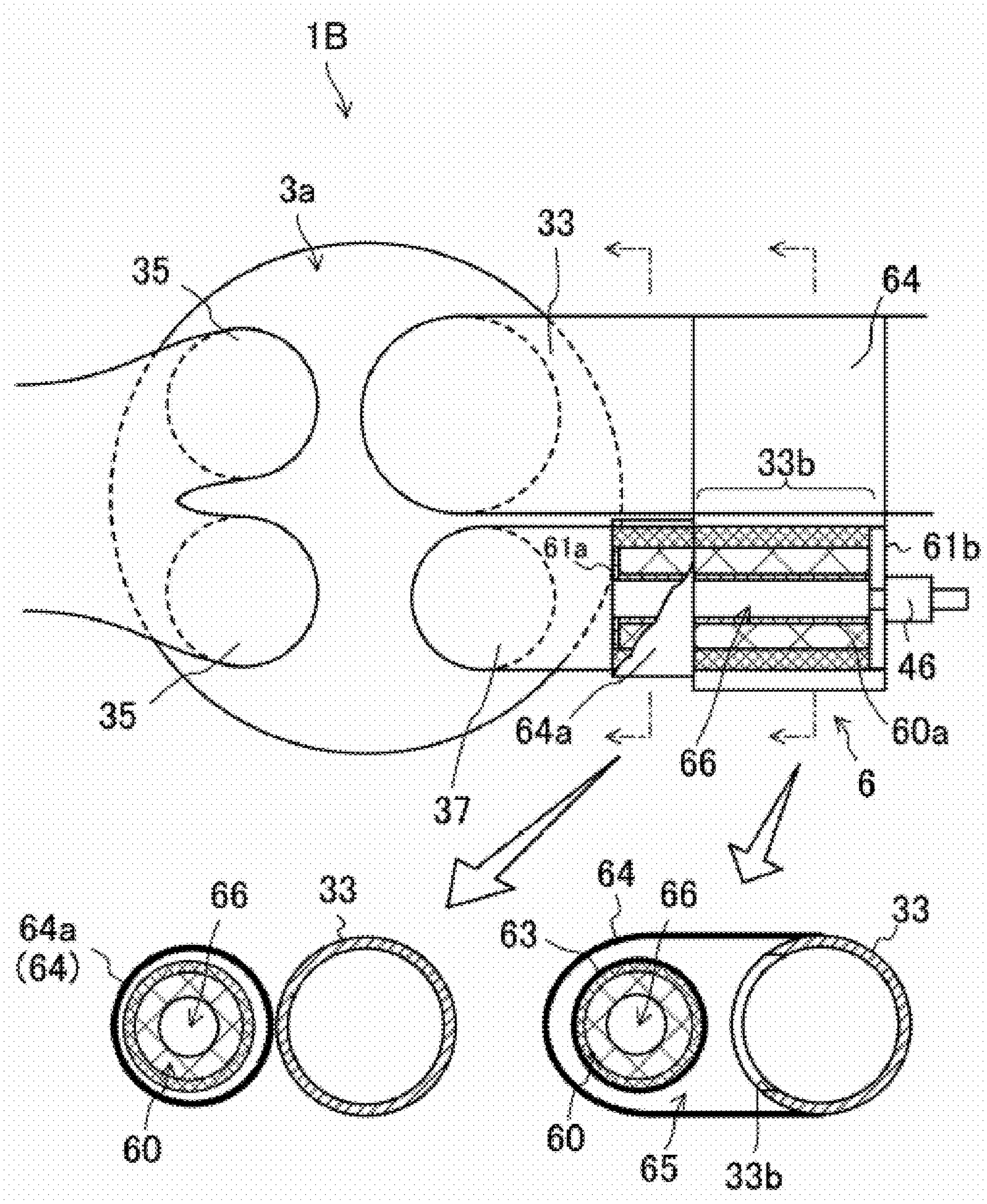
FIG. 8 is a schematic view (corresponding to FIG. 2) of a fuel reforming system according to a second embodiment.

FIG. 8 illustrates another example of the fuel reforming system (second fuel reforming system 1B) mounted on the vehicle. A basic configuration of the second fuel reforming system 1B is the same as that of the first fuel reforming system 1A. Thus, the same reference numerals are used to simplify or omit the description of the components having the same contents.

(Configuration of Second Fuel Reforming System)

The second fuel reforming system 1B differs from the first fuel reforming system 1A in the configurations of the decomposer 6 and the like.

More specifically, in a case of the decomposer 6 of the second fuel reforming system 1B, first, the reforming member 60 further includes a tube 60*a* that has a smaller diameter than the support body 61. Similar to the net 61*a*, the tube 60*a* has a function of catching the carrier 62 and is provided coaxially with the support body 61 at a center thereof.

One end of the tube 60*a* is attached to the net 61*a*, and the other end of the tube 60*a* is attached to the lid body 61*b*. In this way, a central portion of the reforming member 60 is formed with a closed pipe passage 66, an open end of which communicates with the third port 37.

The reforming injector 46 is attached to the lid body 61*b*. The injection hole of the reforming injector 46 faces the inside of the closed pipe passage 66. Accordingly, this reforming injector 46 injects the fuel to be reformed from a closed end side of the closed pipe passage 66 toward the closed pipe passage 66. The reforming injector 46 herein corresponds to the second injector.

In the case of the decomposer 6 of the second fuel reforming system 1B, secondly, the case 64 has a non-communicating section 64*a* that does not have the communication space 65. More specifically, the tubular non-communicating section 64*a* is provided in a portion of the case 64 on the third port 37 side in a manner to only surround the reforming member 60.

Correspondingly, the opening 33*b* of the intake port 33 is not formed in the non-communicating section 64*a*. The hydrogen permeable membrane 63 is not formed in the non-communicating section 64*a*, either. The opening 33*b* of the intake port 33 is formed in a portion of the case 64, which has the communication space 65, on an opposite side of the third port 37.

(Controller)

In the second fuel reforming system 1B, as indicated by the imaginary line in FIG. 4, devices are added to the control system 2 of the first fuel reforming system 1A. More specifically, the decomposer temperature sensor 25 and the hydrogen gas sensor 26 are further electrically connected to the controller 21.

The decomposer temperature sensor 25 is attached to the decomposer 6. The decomposer temperature sensor 25 measures an internal temperature of the decomposer 6. The controller 21 outputs a control signal to the decomposer temperature sensor 25. Based on the control signal from the controller 21, the decomposer temperature sensor 25 outputs a signal corresponding to the internal temperature of the decomposer 6 to the controller 21. The controller 21 determines appropriateness of the temperature of the decomposer 6 based on the signal from the decomposer temperature sensor 25.

The hydrogen gas sensor 26 is attached to the decomposer 6. The hydrogen gas sensor 26 measures an amount of the hydrogen gas. The controller 21 outputs a control signal to the hydrogen gas sensor 26. Based on the control signal from the controller 21, the hydrogen gas sensor 26 outputs a signal corresponding to the amount of the hydrogen gas (concentration of the hydrogen gas) to the controller 21. The controller 21 determines a degree of performance degradation of the decomposer 6 based on the signal from the hydrogen gas sensor 26.

(Operation of Reciprocating Engine)

In the second fuel reforming system 1B, similarly to the first fuel reforming system 1A, the engine 3 performs the six-stroke cycle in order for the decomposer 6 to decompose the hydrocarbon fuel. That is, the engine 3 performs each of the strokes illustrated in FIG. 5.

Figure 9:
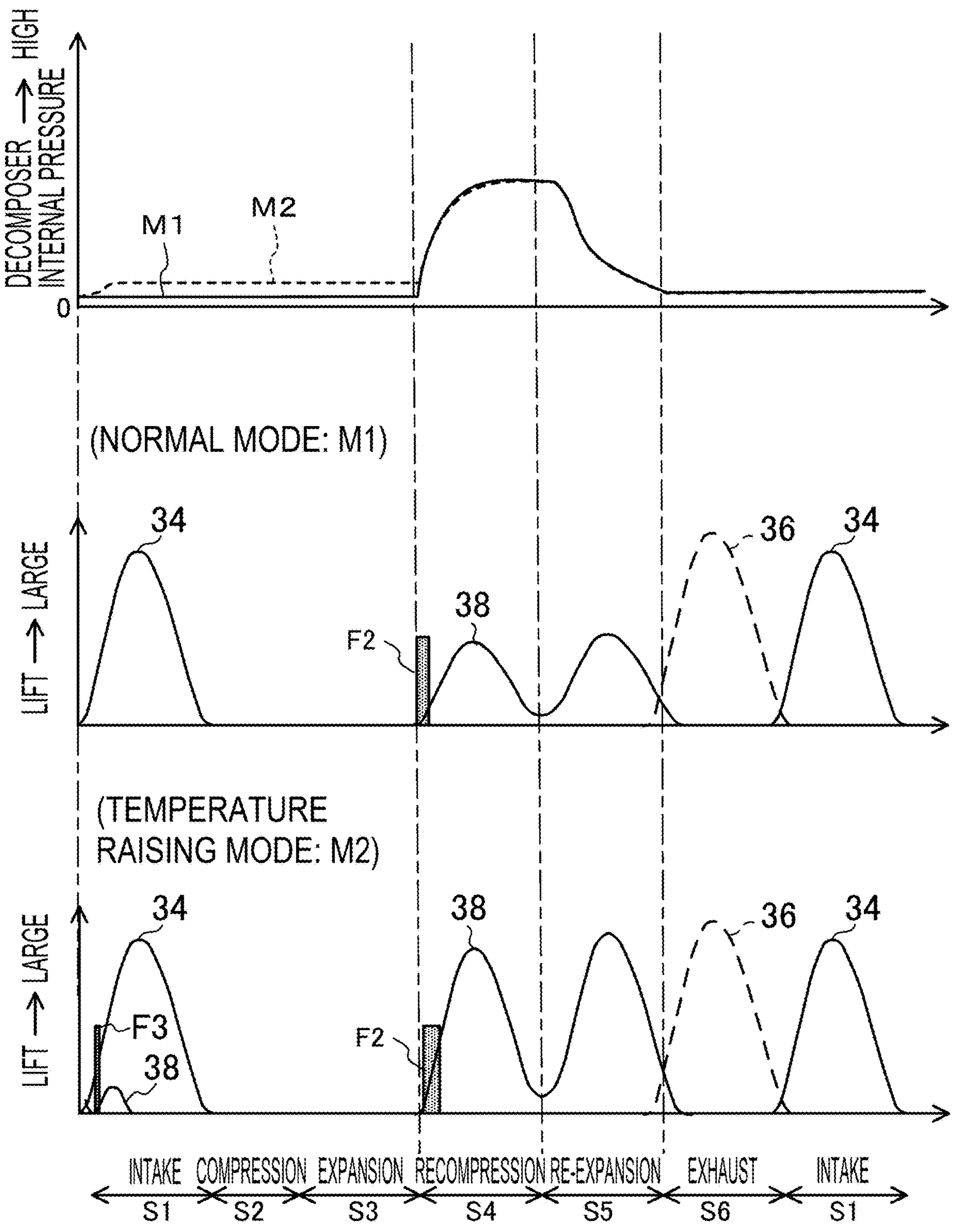
FIG. 9 illustrates examples of operation of each valve, injection timing of fuel to be reformed, and a change in an internal pressure of a decomposer.

However, the content thereof is different from that of the first fuel reforming system 1A. First, the injection timing of the fuel to be reformed is different. Secondly, there are two operation modes including a normal mode and a temperature-raising mode. FIG. 9 illustrates examples of the valve timing and the valve lift of each of the valves, the injection timing of the fuel to be reformed, and a change in an internal pressure of the decomposer 6 in these normal mode and temperature-raising mode.

A middle chart of FIG. 9 illustrates the valve timing and the like of each of the valves in a normal mode M1. A bottom chart illustrates the valve timing and the like of each of the valves in the temperature-raising mode M2. The top chart illustrates the change in the internal pressure of the decomposer 6 in these normal mode M1 and temperature-raising mode M2.

Figure 10:
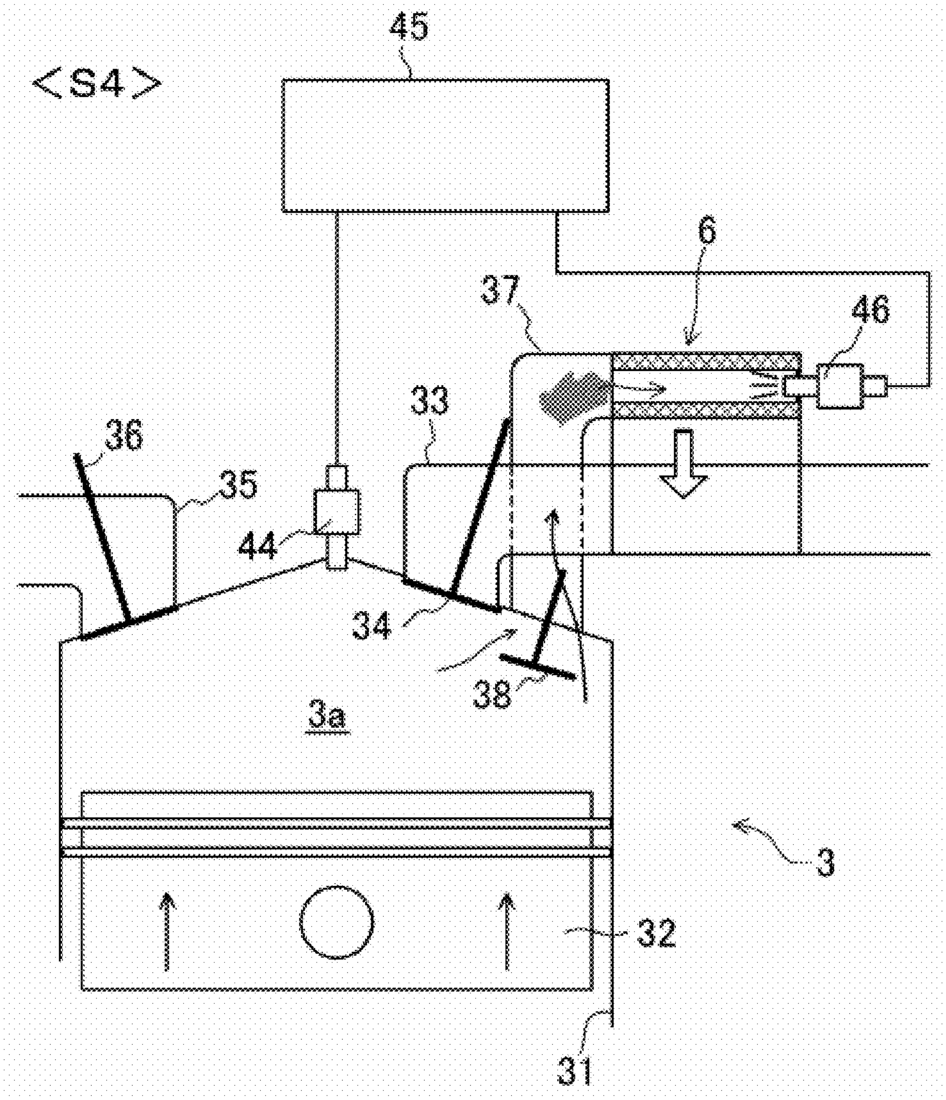
FIG. 10 is a view illustrating a predetermined state in a recompression stroke.

In the second fuel reforming system 1B, as indicated by a reference numeral F2 in FIG. 9, the fuel to be reformed is injected from the reforming injector 46 in a first half of the recompression stroke S4. FIG. 10 illustrates such a state. In the recompression stroke S4, the piston 32 is raised, and the on-off valve 38 is opened. In this way, the high-temperature combustion gas in the combustion chamber 3*a* is introduced into the decomposer 6 through the third port 37.

In the first half of the recompression stroke S4, the internal pressure of the combustion chamber 3*a* is still low. When the on-off valve 38 is opened in this state, due to the small differential pressure with respect to the internal pressure of the decomposer 6, the high-temperature combustion gas in the combustion chamber 3*a* gently flows into the third port 37.

Then, in this state, when the fuel to be reformed is injected from the closed end side of the closed pipe passage 66 toward the closed pipe passage 66, the fuel to be reformed rapidly flows toward the third port 37 through the closed pipe passage 66. At this time, the combustion gas flows into the third port 37 while the amount thereof is increased. The fuel to be reformed collides with the combustion gas.

Accordingly, it is possible to prevent the fuel to be reformed from flowing into the combustion chamber 3*a*. Then, the fuel to be reformed is effectively dispersed in the high-temperature combustion gas and vaporized. At this time, a valve lift amount of the on-off valve 38 may be relatively made small. In this way, a vigorous state of the combustion gas flowing vigorously into the third port 37 can be maintained for a long time. This is advantageous for prevention of outflow and homogenization of the fuel to be reformed.

Then, the high-temperature combustion gas in a state where the fuel to be reformed is homogenized is made to flow back to the closed pipe passage 66 by the fuel gas that sequentially flows into the third port 37. The homogenized fuel to be reformed can efficiently contact the catalyst. In this state, the internal pressure of the decomposer 6 is gradually increased. Accordingly, the reforming reaction can be promoted. Accordingly, the hydrogen gas can be effectively produced.

In the second fuel reforming system 1B, the normal mode M1 and the temperature-raising mode M2 are executed according to the temperature of the decomposer 6. More specifically, the normal mode M1 is executed in a state where the temperature of the decomposer 6 is suitable for the reforming reaction. The temperature-raising mode M2 is executed in a state where the temperature of the decomposer 6 is low and thus unsuitable for the reforming reaction.

The basic operation in the normal mode M1 is the same as that of the first fuel reforming system 1A except for the injection timing of the fuel to be reformed. In contrast, in the boost mode M2, as indicated by a reference sign F3 in FIG. 9, the fuel to be reformed is injected from the reforming injector 46 during the intake stroke S1 (preliminary injection). At the same time, operation to temporarily open the on-off valve 38 (temporary valve opening operation) is performed.

By the preliminary injection, the hydrocarbon fuel is supplied to the inside of the third port 37. A preliminary injection amount may be relatively small. In the intake stroke S1, the intake air (fresh air) is introduced into the combustion chamber 3*a*. Accordingly, by opening the on-off valve 38 during the intake stroke S1, some of the intake air also flows into the support body 61.

In the temporary valve opening operation, the on-off valve 38 may be instantaneously opened in the first half of the intake stroke S1. That is, the valve lift amount of the on-off valve 38 may be small. The valve timing in the temporary valve opening operation is preferably immediately after the preliminary injection, that is, immediately after the exhaust valve 36 is closed. Since the exhaust valve 36 is closed, the exhaust gas no longer flows out of the combustion chamber 3*a*.

Meanwhile, the intake valve 34 starts to open greatly. Accordingly, the large amount of the intake air flows into the third port 37 at the relatively low internal pressure, and the injected fuel to be reformed collides with the intake air.

As a result, in addition to the hydrocarbon fuel, the air (oxygen) is also supplied into the decomposer 6. Thus, the reforming reaction (especially, a partial oxidation reaction) is likely to occur on the inside of the decomposer 6. The internal pressure of the decomposer 6 is also slightly increased. Such a state also continues in the intake stroke S1, the compression stroke S2, and the expansion stroke S3.

Since the decomposer 6 is located in the vicinity of the combustion chamber 3*a*, and the heat is easily transferred thereto, the internal temperature of the decomposer 6 is increased by the combustion in the combustion chamber 3*a* during that time. Moreover, since the partial oxidation reaction is an exothermic reaction, the internal temperature of the decomposer 6 can be further increased.

Furthermore, the inside of the decomposer 6 can be maintained for a long time in a state where the partial oxidation reaction is likely to occur. Thus, the production of the hydrogen gas can be promoted, and the produced amount of the hydrogen gas can be increased.

Thereafter, the same operation as in the normal mode M1 is performed in the boost mode M2. However, the injection amount of the fuel to be reformed may be increased. The valve lift amount of the on-off valve 38 may also be increased.

Due to the preliminary injection and the temporary valve opening operation, the temperature and pressure inside the decomposer 6 are in the state suitable for the partial oxidation reaction. Accordingly, when the injection amount of the fuel to be reformed is increased, and the valve lift amount of the on-off valve 38 is increased in the recompression stroke S4, the partial oxidation reaction can be further promoted. The internal temperature of the decomposer 6 can be increased. The produced amount of the hydrogen gas can be increased.

Meanwhile, the produced amount of the impure gas is also increased. To handle this, scavenging can be promoted by increasing the valve lift amount in the re-expansion stroke S5. Even when the amount of the impure gas is increased, the impure gas can be effectively eliminated from the inside of the decomposer 6.

Specific Example of Control by Second Fuel Reforming System

Figure 11:
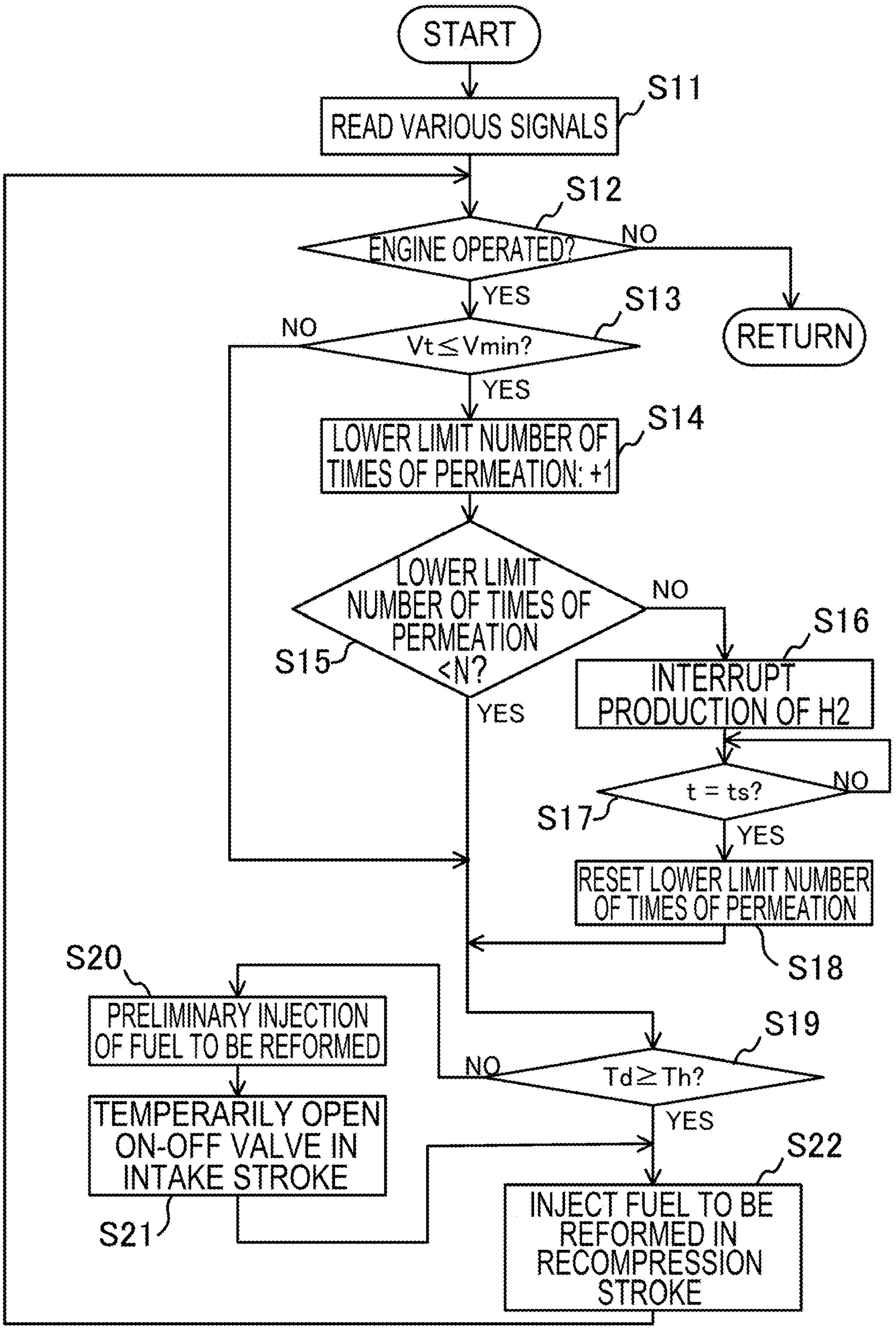
FIG. 11 is a flowchart of control by a second fuel reforming system.

FIG. 11 illustrates an example of control by the second fuel reforming system 1B. It is assumed that the engine 3 performs the combustion in the above-described six-stroke cycle.

The controller 21 reads the various signals input from the accelerator sensor 23 and the like (step S11). During the operation of the engine 3, the controller 21 identifies the output required for the engine 3 based on the read signals, and executes the operation in the above-described six-stroke cycle (Yes in step S12). Then, with the termination of the operation of the engine 3, the control by the controller 21 is also terminated (No in step S12).

During the operation of the engine 3, the controller 21 estimates a hydrogen permeation amount Vt (an amount of the hydrogen gas permeating the hydrogen permeable membrane 63) based on the signal from the hydrogen gas sensor 26 and the like. Then, the controller 21 determines whether the hydrogen permeation amount Vt is equal to or smaller than a predetermined lower limit value Vmin set in advance in the controller 21 (step S13).

As a result, if the hydrogen permeation amount Vt is equal to or smaller than the lower limit value Vmin, the controller 21 adds "1" to the predetermined lower limit number of times of the permeation (the number of times that the hydrogen permeation amount Vt becomes equal to or smaller than the lower limit value Vmin), which is counted by the controller 21 (step S14).

Thereafter, the controller 21 determines whether the lower limit number of times of the permeation is smaller than the predetermined limited number of times N set in advance in the controller 21 (step S15). As a result, when the lower limit number of times of the permeation is equal to or larger than the limited number of times N, the controller 21 interrupts the production of the hydrogen gas (step S16).

That is, since it is considered that the reforming reaction is inhibited due to an increase in the amount of the impure gas remaining in the decomposer 6, the controller 21 executes processing to repeat scavenging (complete scavenging processing) without injecting the fuel to be reformed. More specifically, the controller 21 determines whether a predetermined set time ts, which is set in advance in the controller 21, has elapsed (step S17), and repeats the operation in the six-stroke cycle until the set time ts elapses (No in step S17).

On the other hand, if the set time ts has elapsed, the controller 21 terminates the complete scavenging processing and resets the lower limit number of times of the permeation (step S18).

In step S13 described above, if the hydrogen permeation amount Vt exceeds a lower limit value Vmin, that is, when the production of the hydrogen gas is appropriate, the controller 21 determines whether an internal temperature Td of the decomposer 6 is equal to or higher than predetermined determination temperature Th, which is set in advance in the controller 21, based on the signal from the decomposer temperature sensor 25 (step S19).

In step S15, if the lower limit number of times of the permeation is smaller than the limited number of times N, that is, when the complete scavenging processing is not necessary yet, the controller 21 makes the same determination. Furthermore, the controller 21 also makes the same determination when the complete scavenging processing is terminated.

The determination temperature Th corresponds to a lower limit value of a temperature range suitable for the partial oxidation reaction. Thus, when the internal temperature Td of the decomposer 6 is lower than the determination temperature Th, the partial oxidation reaction cannot be appropriately performed. Accordingly, if the internal temperature Td of the decomposer 6 is lower than the determination temperature Th (No in step S19), the controller 21 executes the temperature-raising mode.

That is, the controller 21 executes the preliminary injection and the temporary valve opening operation described above (steps S20 and S21). As a result, the inside of the decomposer 6 is maintained in the state suitable for the partial oxidation reaction. In this way, the temperature inside the decomposer 6 can be raised to the determination temperature Th or higher. The partial oxidation reaction can be appropriately performed.

If the internal temperature Td of the decomposer 6 is equal to or higher than the determination temperature Th (Yes in step S19), the controller 21 executes the normal mode. That is, the fuel to be reformed is injected in the recompression stroke S4 (step S22). In addition, similar to the normal mode, after the execution of the preliminary injection and the temporary valve opening operation in the temperature-raising mode, the controller 21 injects the fuel to be reformed in the recompression stroke S4 (step S22). At this time, as described above, the injection amount may be increased, and the valve lift amount of the on-off valve 38 may also be increased. The produced amount of the hydrogen gas can be increased.

During the operation of the engine 3, the controller 21 repeats such processing.

Third Embodiment

Figure 12:
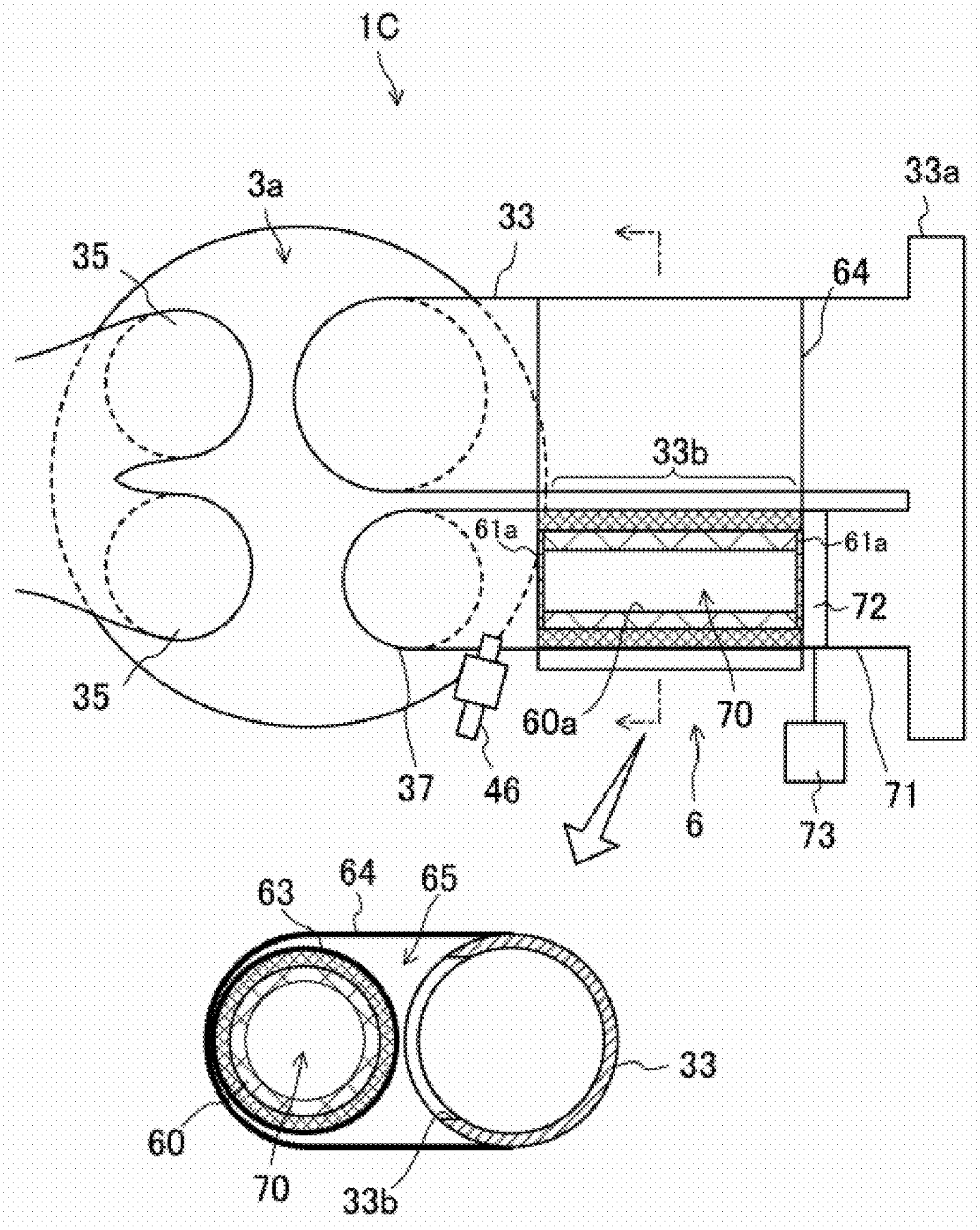
FIG. 12 is a schematic view (corresponding to FIG. 2) of a fuel reforming system according to a third embodiment.

FIG. 12 illustrates further another example of the fuel reforming system (third fuel reforming system 1C) mounted on the vehicle. The third fuel reforming system 1C has the same element as and a different element from the first fuel reforming system 1A and the second fuel reforming system 1B. Thus, the same reference numerals are used to simplify or omit the description of the components having the same contents.

(Configuration of Third Fuel Reforming System)

In the third fuel reforming system 1C, similar to the first fuel reforming system 1A, the reforming injector 46 is disposed in the third port 37. In addition, the reforming member 60 and the case 64 similar to those of the first fuel reforming system 1A are provided. However, the net 61*a* is attached to the openings on both sides of the support body 61.

Similar to the second fuel reforming system 1B, the tube 60*a* is provided inside the reforming member 60. The tube 60*a* is formed to have a larger diameter than that of the second fuel reforming system 1B (the large-diameter tube 60*a*). Both ends of the large-diameter tube 60*a* are attached to the respective nets 61*a*. A large-diameter communication passage 70 is formed inside the reforming member 60 by the large-diameter tube 60*a*.

The decomposer 6 is connected to the intake manifold 33*a* via a relay port 71. Thus, the third port 37 communicates with the intake manifold 33*a* via the communication passage 70 and the relay port 71. A regulation valve 72 is installed between the intake manifold 33*a* and the communication passage 70.

Examples of the regulation valve 72 include a butterfly valve, a rotary valve, and a check valve. The regulation valve 72 allows the flow from the intake manifold 33*a* side to the third port 37 side. That is, in the third fuel reforming system, the third port 37, the communication passage 70, and the relay port 71 may also function as the intake port 33. Meanwhile, the regulation valve 72 does not allow at least the flow from the third port 37 side to the intake manifold 33*a* side.

The exemplified regulation valve 72 is configured to be openable/closable and be shut off by the regulation valve opening/closing device 73. Opening of the regulation valve 72 allows the flow of the intake air from the intake manifold 33*a* side to the third port 37 side. By closing the regulation valve 72, such a flow path is shut off. In this way, not only the flow from the intake manifold 33*a* side to the third port 37 side, but also the flow from the third port 37 side to the intake manifold 33*a* side is disabled.

In the third fuel reforming system 1C, as indicated by the imaginary lines in FIG. 4, the regulation valve opening/closing device 73 is added to the control system 2 of the first fuel reforming system 1A together with the decomposer temperature sensor 25 and the hydrogen gas sensor 26.

More specifically, the regulation valve opening/closing device 73 is further electrically connected to the controller 21. The controller 21 outputs a control signal to the regulation valve opening/closing device 73 according to the operating state of the engine 3. The regulation valve opening/closing device 73 opens/closes the regulation valve 72 based on the control signals from the controller 21 including the signal from the crank angle sensor 24.

(Operation of Reciprocating Engine)

In the third fuel reforming system 1C, similarly to the first fuel reforming system 1A, the engine 3 performs the six-stroke cycle in order for the decomposer 6 to decompose the hydrocarbon fuel. That is, the engine 3 performs each of the strokes illustrated in FIG. 5.

However, the content thereof is different from that of the first fuel reforming system 1A. The third fuel reforming system 1C has an operation mode (filling efficiency improvement mode) for improving filling efficiency.

This engine 3 has the only one intake port 33. For this reason, for example, when the engine 3 is operated in a high-load and high-speed range, the filling efficiency may be insufficient. Thus, in the third fuel reforming system 1C, the insufficient filling efficiency is compensated by the filling efficiency improvement mode.

Figure 13:
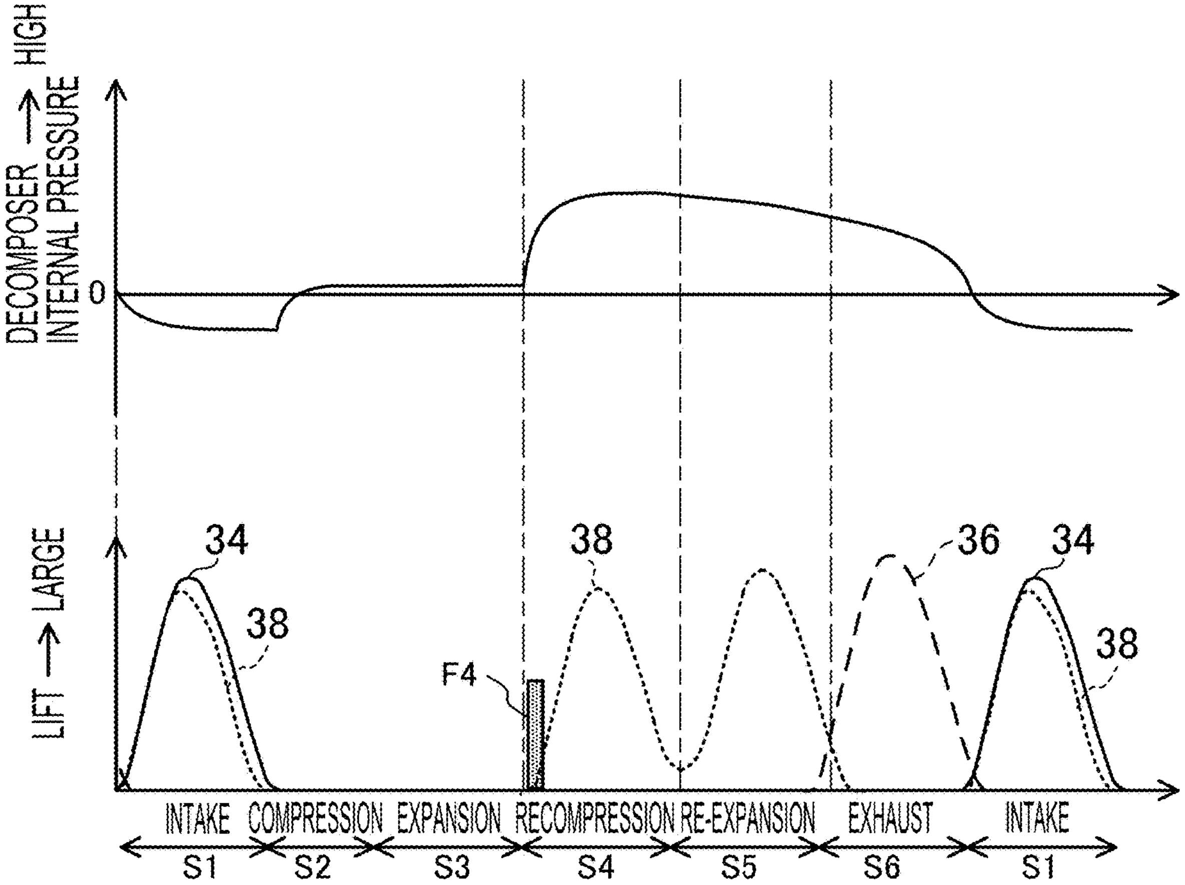
FIG. 13 illustrates examples of operation of each valve, injection timing of fuel to be reformed, and a change in an internal pressure of a decomposer.

FIG. 13 illustrates examples of the valve timing and the valve lift of each of the valves, the injection timing of the fuel to be reformed, and the change in the internal pressure of the decomposer 6 in the filling efficiency improvement mode.

Figure 14:
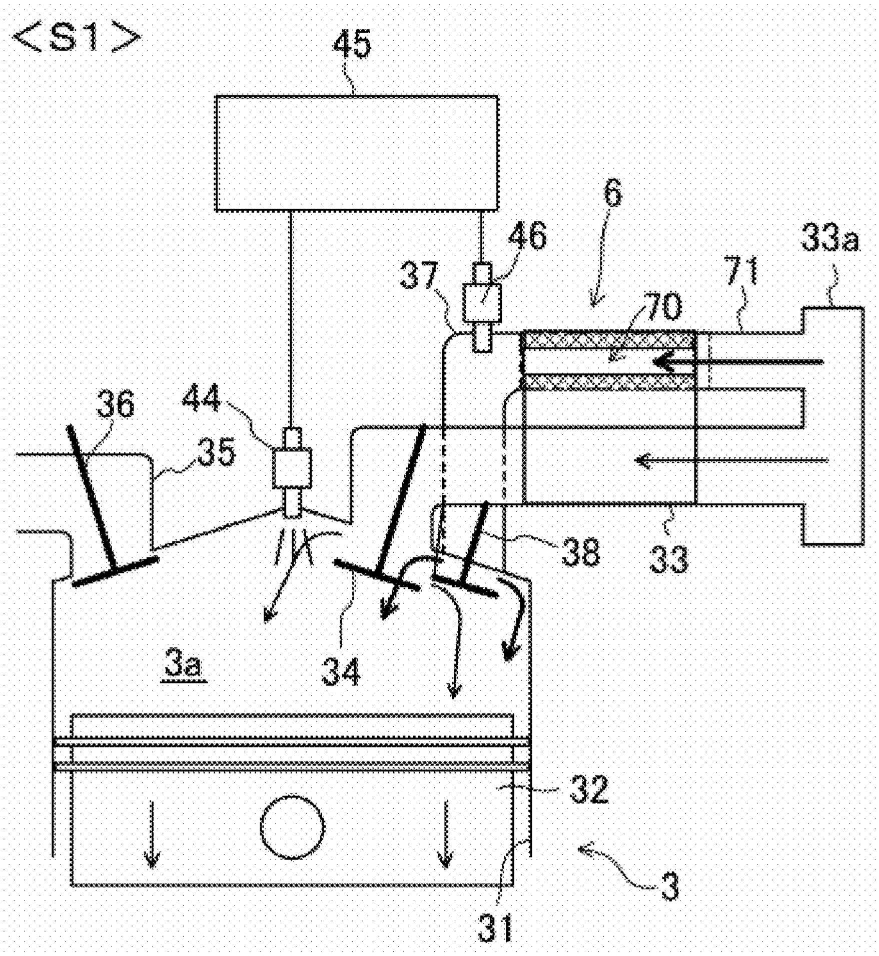
FIG. 14 is a view illustrating a predetermined state in an intake stroke.

In the filling efficiency improvement mode, the regulation valve 72 is opened prior to the intake stroke S1. Then, in a state where the regulation valve 72 is opened, the on-off valve 38 is opened during the intake stroke S1. FIG. 14 exemplifies a state of the intake stroke S1 in the filling efficiency improvement mode. The valve lift amount of the on-off valve 38 is set according to the required filling efficiency. Normally, the on-off valve 38 is also opened in the same manner as the intake valve 34.

Accordingly, in addition to the intake air introduced from the intake port 33, the intake air is introduced into the combustion chamber 3*a* through a path including the relay port 71, the communication passage 70, and the third port 37. As a result, the filling efficiency can be improved.

In addition, when the intake air is introduced from one place by the intake port 33, a strong flow (particularly, a swirl flow) is generated in the combustion chamber 3*a*. Meanwhile, by introducing the intake air from two places, the flow can be mitigated. Thus, the filling efficiency improvement mode improves combustion performance.

Since the piston is lowered during the intake stroke S1, the internal pressure of the decomposer 6 in communication with the intake port 33 dynamically becomes a negative pressure. When the intake stroke S1 is terminated, and the stroke proceeds to the compression stroke S2, the on-off valve 38 is closed together with the intake valve 34. Accordingly, the internal pressure of the decomposer 6 returns to a positive pressure. The inside of the decomposer 6 is filled with the intake air (air).

In the filling efficiency improvement mode, as indicated by the reference numeral F4 in FIG. 13, similar to the second fuel reforming system 1B, the fuel to be reformed is injected in the first half of the recompression stroke S4. In the recompression stroke S4, the combustion gas in the combustion chamber 3*a* is compressed by raising the piston 32. Then, when the on-off valve 38 is opened, the compressed combustion gas is introduced into the decomposer 6 through the third port 37.

At this time, when the regulation valve 72 is open, the combustion gas rapidly flows into the third port 37. Thus, the injected fuel to be reformed is effectively dispersed in the combustion gas. Then, the combustion gas in the state where the fuel to be reformed is homogenized is introduced into the decomposer 6. The inside of the decomposer 6 is filled with the high-temperature combustion gas and the air (oxygen)

required for the reforming reaction (including the partial oxidation reaction). Thus, the reforming reaction can be promoted.

Thereafter, the regulation valve 72 is closed. The regulation valve 72 may be closed before the recompression stroke S4. The third fuel reforming system 1C in the closed state of the regulation valve 72 has the same configuration as the first fuel reforming system 1A except for the communication passage 70. Thus, in this case, the combustion can be performed with the same contents as that of the first fuel reforming system 1A.

Specific Example of Control by Third Fuel Reforming System

Figure 15A:
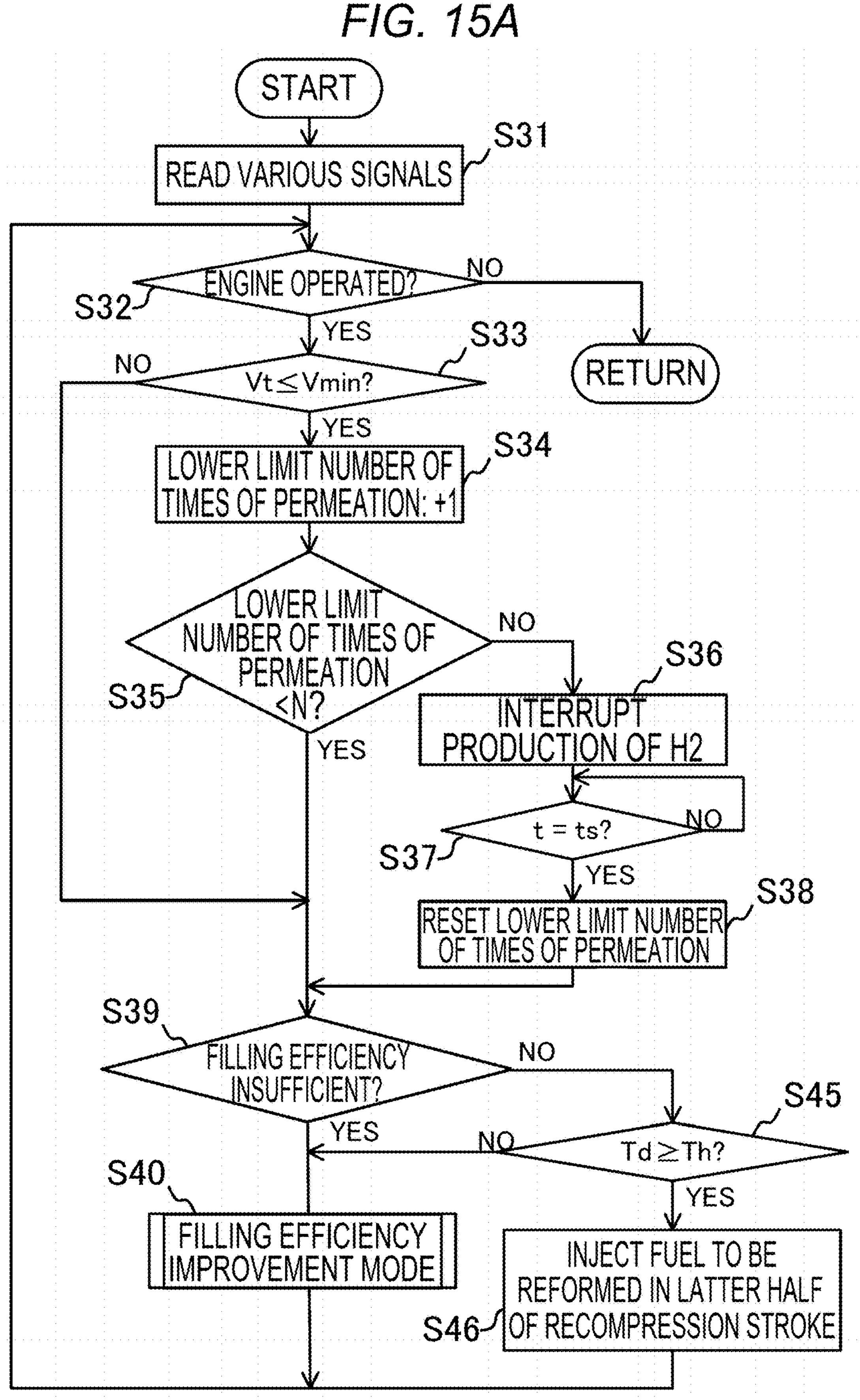
FIG. 15A is a flowchart of control by a third fuel reforming system.

FIG. 15A illustrates an example of control by the third fuel reforming system 1C. It is assumed that the engine 3 performs the combustion in the above-described six-stroke cycle.

The controller 21 reads the various signals input from the accelerator sensor 23 and the like (step S31). During the operation of the engine 3, the controller 21 identifies the output required for the engine 3 based on the read signals, and executes the operation in the above-described six-stroke cycle (Yes in step S32). Then, with the termination of the operation of the engine 3, the control by the controller 21 is also terminated (No in step S32).

During the operation of the engine 3, the controller 21 estimates the hydrogen permeation amount Vt based on the signal from the hydrogen gas sensor 26 and the like. Then, the controller 21 determines whether the hydrogen permeation amount Vt is equal to or smaller than the predetermined lower limit value Vmin set in advance in the controller 21 (step S33).

As a result, if the hydrogen permeation amount Vt is equal to or smaller than the lower limit value Vmin, the controller 21 adds "1" to the predetermined lower limit number of times of the permeation, which is counted by the controller 21 (step S34).

Thereafter, the controller 21 determines whether the lower limit number of times of the permeation is smaller than the predetermined limited number of times N set in advance in the controller 21 (step S35). As a result, when the lower limit number of times of the permeation is equal to or larger than the limited number of times N, the controller 21 interrupts the production of the hydrogen gas (step S36). Then, the controller 21 performs the complete scavenging processing.

That is, the controller 21 determines whether the predetermined set time ts, which is set in advance in the controller 21, has elapsed (step S37), and repeats the operation in the six-stroke cycle until the set time ts elapses (No in step S37).

On the other hand, if the set time ts has elapsed, the controller 21 terminates the complete scavenging processing and resets the lower limit number of times of the permeation (step S38).

In step S33 described above, if the hydrogen permeation amount Vt exceeds the lower limit value Vmin, that is, when the production of the hydrogen gas is appropriate, the controller 21 estimates the filling efficiency in reality (actual filling efficiency) based on the various signals, and determines whether the actual filling efficiency is insufficient with respect to the required appropriate filling efficiency (required filling efficiency) (step S39).

In step S35, if the lower limit number of times of the permeation is smaller than the limited number of times N, that is, when the complete scavenging processing is not necessary yet, the controller 21 makes the same determination. Furthermore, the controller 21 also makes the same determination when the complete scavenging processing is terminated.

As a result, if it is determined that the actual filling efficiency is insufficient with respect to the required filling efficiency, the controller 21 executes the operation in the filling efficiency improvement mode (step S40).

Figure 15B:
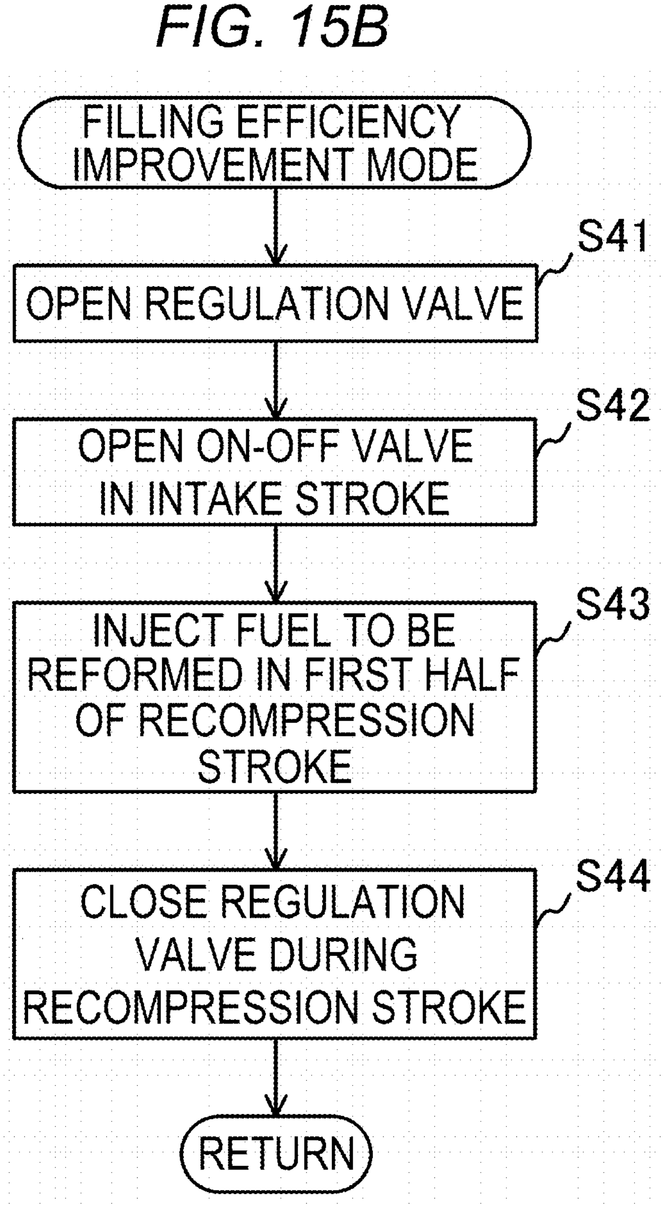
FIG. 15B is a flowchart of control by the third fuel reforming system.

FIG. 15B illustrates a control example in the filling efficiency improvement mode. In the filling efficiency improvement mode, the controller 21 opens the regulation valve 72 prior to the intake stroke S1 (step S41). Thereafter, as illustrated in FIG. 13, the controller 21 opens the on-off valve 38 in the intake stroke S1 (step S42).

As a result, as illustrated in FIG. 14, the intake air is introduced into the combustion chamber 3*a* through the two paths. As a result, the filling efficiency can be improved, and the required filling efficiency can be achieved. The strong flow in the combustion chamber 3*a* can be mitigated. Thus, the filling efficiency improvement mode improves the combustion performance. The temperature of the combustion gas is increased. The inside of the decomposer 6 is filled with the intake air (air).

Thereafter, the controller 21 outputs the control signal to the reforming injector 46 to inject the fuel to be reformed in the first half of the recompression stroke S4 (step S43). Since the regulation valve 72 is open, the high-temperature combustion gas flows vigorously into the third port 37 by opening the on-off valve 38. Thus, the injected fuel to be reformed is effectively dispersed in the combustion gas.

Then, the high-temperature combustion gas in the state where the reformed fuel is homogenized is introduced into the decomposer 6. The inside of the decomposer 6 is filled with the high-temperature combustion gas and the air (oxygen) required for the reforming reaction. Thus, the reforming reaction can be promoted.

The controller 21 closes the regulation valve 72 at predetermined timing during the recompression stroke S4 (step S44). The timing is timing at which the combustion gas containing the fuel to be reformed does not flow out of the decomposer 6 toward the relay port 71. For example, the regulation valve 72 may be closed simultaneously with or immediately after the injection of the fuel to be reformed. As described above, the regulation valve 72 may be closed before the recompression stroke S4.

The controller 21 may open/close the regulation valve 72 in the re-expansion stroke S5. In the case where the regulation valve 72 is open in the re-expansion stroke S5, the inside of the decomposer 6 can be effectively scavenged. The reforming reaction can be promoted. In addition, since the pump loss of the engine 3 is also reduced, energy loss can also be suppressed.

On the other hand, if it is determined that the actual filling efficiency is not insufficient with respect to the required filling efficiency, that is, the appropriate filling efficiency is ensured (No in step S39), the controller 21 determines whether the internal temperature Td of the decomposer 6 is equal to or higher than the predetermined determination temperature Th based on the signal from the decomposer temperature sensor 25 (step S45).

As a result, if the internal temperature Td of the decomposer 6 is equal to or higher than the determination temperature Th (Yes in step S45), that is, when the internal temperature of the decomposer 6 is suitable for the reforming reaction, similar to the first fuel reforming system 1A, the controller 21 injects the fuel to be reformed in the latter half of the recompression stroke S4 (step S46).

On the other hand, if the internal temperature Td of the decomposer 6 is lower than the determination temperature Th, that is, when the temperature is insufficient and the reforming reaction cannot be appropriately performed, the controller 21 executes the filling efficiency improvement mode (No in step S45). When the filling efficiency improvement mode is executed, the internal temperature of the decomposer 6 can be increased. Thus, the generation of the hydrogen gas can be promoted.

After steps S40 and S46, the processing returns to processing prior to step S32. That is, during the operation of the engine 3, the controller 21 repeats a series of such processing.

Note that the disclosed technique is not limited to the above-described embodiments, and includes various other configurations. For example, the contents of the embodiments may be appropriately combined as necessary. The vehicle to which the disclosed technique can be applied is not limited to a hybrid vehicle. The drive source may be the reciprocating engine only.

Embodiments of the disclosed subject matter can also be as set forth according to the following brackets/parentheticals.

[1]

A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port.

[2]

The fuel reforming system according to [1], further comprising:

a first injector to inject the hydrocarbon fuel inside of the third port is attached to the third port, wherein the fuel reforming system is configured to, in a latter half of the recompression stroke, inject the hydrocarbon fuel from the first injector in an open state of the third port.

[3]

The fuel reforming system according to [1] or [2], wherein the decomposer includes:

a case that installed along the intake port;

a reformer accommodated in the case so as to extend along the case; and a closed pipe passage in a central portion of the reformer and having an open end which communicates with the third port, a second injector to inject the hydrocarbon fuel from a closed end side of the closed pipe passage toward the closed pipe passage attached to the decomposer, wherein the fuel reforming system is configured to, in a first half of the recompression stroke, inject the hydrocarbon fuel from the second injector in an open state of the third port.

[4]

The fuel reforming system according to any one of [1] to [3], wherein the third port is in an open state during the re-expansion stroke.

[5]

The fuel reforming system according to any one of [1] to [4], wherein the third port is in an open state during the re-expansion stroke.

[6]

The fuel reforming system according to any one of [1] to [5], wherein the decomposer has a communication passage therein, the communication passage communicating between the third port and an intake supply located on an upstream side of the intake port, and a regulation valve configured to block a flow from the third port side toward the intake supply side is between the intake supply and the communication passage.

[7]

The fuel reforming system according to any one of [1] to [6], further comprising control circuitry configured to control the fuel reforming system according to the six-stroke cycle, including selective opening and closing of the third port.

[8]

The fuel reforming system according to any one of [1] to [7], further comprising:

the third port, wherein the decomposer is fluidly between the third port and the intake port.

[9]

The fuel reforming system according to any one of [1] to [8], wherein the decomposer includes a catalyst to decompose the hydrocarbon fuel into the carbon gas and the hydrogen gas based on the heat and the pressure of the combustion gas produced in the combustion chamber.

A fuel reforming method using a fuel reforming system for a reciprocating engine having a combustion chamber where combustion occurs partitioned in a cylinder in which a piston is operative to reciprocate, the method comprising:

controlling performance of an intake stroke in which at least intake air is introduced into the combustion chamber through an intake port by lowering the piston;

controlling performance of a compression stroke in which air-fuel mixture containing fuel supplied to the combustion chamber is compressed by raising the piston;

controlling performance of an expansion stroke in which the piston is lowered by combustion of the air-fuel mixture;

controlling performance of a recompression stroke in which combustion gas is compressed by raising the piston;

controlling performance of a re-expansion stroke in which the piston is lowered; and controlling performance of an exhaust stroke in which exhaust gas is discharged through an exhaust port by raising the piston, wherein the fuel reforming system includes:

a decomposer in fluid communication with the combustion chamber to decompose hydrocarbon fuel into carbon and hydrogen gas, a hydrocarbon fuel supply to supply the hydrocarbon fuel to the decomposer, the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane of the decomposer, the decomposer is adjacent to and in fluid communication with the intake port, and the fuel reforming system is configured to supply the separated hydrogen gas as fuel to the combustion chamber through the intake port.

The method according to [10], further comprising:

injecting, using a first injector, the hydrocarbon fuel inside of a third port in an open state of the third port.

The method according to or [11], wherein the decomposer includes:

a case that installed along the intake port;

a reformer accommodated in the case so as to extend along the case; and a closed pipe passage in a central portion of the reformer and having an open end which communicates with the third port, a second injector to inject the hydrocarbon fuel from a closed end side of the closed pipe passage toward the closed pipe passage attached to the decomposer, wherein the fuel reforming system is configured to, in a first half of the recompression stroke, inject the hydrocarbon fuel from the second injector in an open state of the third port.

[13]

The method according to any one of to [12], wherein the decomposer has a communication passage therein, the communication passage communicating between the third port and an intake supply located on an upstream side of the intake port, and a regulation valve configured to block a flow from the third port side toward the intake supply side is between the intake supply and the communication passage.

[14]

The method according to any one of to [13], further comprising controlling, using control circuitry, the fuel reforming system according to a six-stroke cycle, including selective opening and closing of a third port.

[15]

The method according to any one of to [14], further comprising:

a third port, wherein the decomposer is fluidly between the third port and the intake port.

The method according to any one of to [15], wherein the decomposer includes a catalyst to decompose the hydrocarbon fuel into the carbon gas and the hydrogen gas based on the heat and the pressure of the combustion gas produced in the combustion chamber.

[17]

A fuel system for a vehicle on which a reciprocating engine is mounted, wherein in the reciprocating engine, a combustion chamber where combustion occurs is partitioned in a cylinder in which a piston reciprocates, the fuel system comprising:

a decomposer, having a hydrogen permeable membrane, to decompose hydrocarbon fuel into carbon and hydrogen gas using heat and a pressure of the combustion gas produced in the combustion chamber; and a third port between and in fluid communication with the combustion chamber and the decomposer, wherein the decomposer is in fluid communication with an intake port via the hydrogen permeable membrane, the decomposer is adjacent to and in fluid communication with the intake port, and the fuel system is configured to supply the separated hydrogen gas as fuel to the combustion chamber through the intake port.

[18]

The fuel system according to [17], further comprising a hydrocarbon fuel supply to supply the hydrocarbon fuel to the decomposer via the third port.

[19]

The fuel system according to or [18], wherein the reciprocating engine is configured to perform a six-stroke cycle including:

an intake stroke in which at least intake air is introduced into the combustion chamber through the intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston.

REFERENCE SIGNS LIST

1A to 1C: fuel reforming system
2: control system
3: reciprocating engine
3*a*: combustion chamber
6: decomposer
21: controller
22: rotational speed sensor
23: acceleration sensor
24: crank angle sensor
25: decomposer temperature sensor
27: spark/ignition plug

28: inverter
28*a*: drive motor
31: cylinder
32: piston
33: intake port
33*a*: intake manifold
33*b*: opening
34: intake valve
35: exhaust port
36: exhaust valve
37: third port
38: on-off valve
41: intake valve train
42: exhaust valve train
43: third valve train
44: direct injection injector
45: hydrocarbon fuel supply section
46: reforming injector
60: reforming member
60*a*: tube
61: support body
61*a*: net
61*b*: lid body
62: carrier
63: hydrogen permeable membrane
64: case
64*a*: non-communicating section
65: communication space
66: closed pipe passage
72: regulation valve
73: regulation valve opening/closing device

The invention claimed is:

1. A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port, wherein the decomposer includes:

a case that installed along the intake port;

a reformer accommodated in the case so as to extend along the case; and a closed pipe passage in a central portion of the reformer and having an open end which communicates with the third port, a second injector to inject the hydrocarbon fuel from a closed end side of the closed pipe passage toward the closed pipe passage attached to the decomposer, wherein the fuel reforming system is configured to, in a first half of the recompression stroke, inject the hydrocarbon fuel from the second injector in an open state of the third port.

2. The fuel reforming system according to claim 1, wherein the third port is in the open state during the re-expansion stroke.

3. A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port, further comprising:

a first injector to inject the hydrocarbon fuel inside of the third port is attached to the third port, wherein the fuel reforming system is configured to, in a latter half of the recompression stroke, inject the hydrocarbon fuel from the first injector in an open state of the third port, and wherein the third port is in the open state during the re-expansion stroke.

4. A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port, wherein the decomposer has a communication passage therein, the communication passage communicating between the third port and an intake supply located on an upstream side of the intake port, and a regulation valve configured to block a flow from the third port side toward the intake supply side is between the intake supply and the communication passage.

5. A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port, further comprising control circuitry configured to control the fuel reforming system according to the six-stroke cycle, including selective opening and closing of the third port.

6. A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port, further comprising:

the third port, wherein the decomposer is fluidly between the third port and the intake port.

7. A fuel reforming system for a vehicle on which a reciprocating engine is mounted, wherein in the reciprocating engine, a combustion chamber where combustion occurs is partitioned in a cylinder in which a piston reciprocates, the reciprocating engine being configured to perform a six-stroke cycle including:

an intake stroke in which at least intake air is introduced into the combustion chamber through an intake port by lowering the piston;

a compression stroke in which air-fuel mixture containing fuel supplied to the combustion chamber is compressed by raising the piston;

an expansion stroke in which the piston is lowered by combustion of the air-fuel mixture;

a recompression stroke in which combustion gas is compressed by raising the piston;

a re-expansion stroke in which the piston is lowered; and an exhaust stroke in which exhaust gas is discharged through an exhaust port by raising the piston, the fuel reforming system comprising:

a decomposer configured to communicate with the combustion chamber via an openable/closable third port, decompose hydrocarbon fuel into carbon and hydrogen gas, and store the carbon; and a hydrocarbon fuel supply to supply the hydrocarbon fuel to the decomposer, wherein the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane, the decomposer is in fluid communication with the intake port via the hydrogen permeable membrane, the decomposer is disposed adjacent to and in fluid communication with the intake port, and the fuel reforming system is configured to supply the separated hydrogen gas as fuel to the combustion chamber through the intake port, wherein the decomposer includes a catalyst to decompose the hydrocarbon fuel into the carbon gas and the hydrogen gas based on the heat and the pressure of the combustion gas produced in the combustion chamber.

8. A fuel reforming method using a fuel reforming system for a reciprocating engine having a combustion chamber where combustion occurs partitioned in a cylinder in which a piston is operative to reciprocate, the method comprising:

controlling performance of an intake stroke in which at least intake air is introduced into the combustion chamber through an intake port by lowering the piston;

controlling performance of a compression stroke in which air-fuel mixture containing fuel supplied to the combustion chamber is compressed by raising the piston;

controlling performance of an expansion stroke in which the piston is lowered by combustion of the air-fuel mixture;

controlling performance of a recompression stroke in which combustion gas is compressed by raising the piston;

controlling performance of a re-expansion stroke in which the piston is lowered; and controlling performance of an exhaust stroke in which exhaust gas is discharged through an exhaust port by raising the piston, wherein the fuel reforming system includes:

a decomposer in fluid communication with the combustion chamber to decompose hydrocarbon fuel into carbon and hydrogen gas, a hydrocarbon fuel supply to supply the hydrocarbon fuel to the decomposer, the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane of the decomposer, the decomposer is adjacent to and in fluid communication with the intake port, and the fuel reforming system is configured to supply the separated hydrogen gas as fuel to the combustion chamber through the intake port, wherein the decomposer includes:

a case that installed along the intake port;

a reformer accommodated in the case so as to extend along the case; and a closed pipe passage in a central portion of the reformer and having an open end which communicates with the third port, a second injector to inject the hydrocarbon fuel from a closed end side of the closed pipe passage toward the closed pipe passage attached to the decomposer, wherein the fuel reforming system is configured to, in a first half of the recompression stroke, inject the hydrocarbon fuel from the second injector in an open state of the third port.

9. A fuel reforming method using a fuel reforming system for a reciprocating engine having a combustion chamber where combustion occurs partitioned in a cylinder in which a piston is operative to reciprocate, the method comprising:

controlling performance of an intake stroke in which at least intake air is introduced into the combustion chamber through an intake port by lowering the piston;

controlling performance of a compression stroke in which air-fuel mixture containing fuel supplied to the combustion chamber is compressed by raising the piston:

controlling performance of an expansion stroke in which the piston is lowered by combustion of the air-fuel mixture;

controlling performance of a recompression stroke in which combustion gas is compressed by raising the piston;

controlling performance of a re-expansion stroke in which the piston is lowered; and controlling performance of an exhaust stroke in which exhaust gas is discharged through an exhaust port by raising the piston, wherein the fuel reforming system includes:

a decomposer in fluid communication with the combustion chamber to decompose hydrocarbon fuel into carbon and hydrogen gas, a hydrocarbon fuel supply to supply the hydrocarbon fuel to the decomposer, the decomposer is configured to decompose the hydrocarbon fuel into the carbon and the hydrogen gas using heat and a pressure of the combustion gas produced in the combustion chamber, and separate the hydrogen gas by causing the hydrogen gas to permeate a hydrogen permeable membrane of the decomposer, the decomposer is adjacent to and in fluid communication with the intake port, and the fuel reforming system is configured to supply the separated hydrogen gas as fuel to the combustion chamber through the intake port, wherein the decomposer has a communication passage therein, the communication passage communicating between the third port and an intake supply located on an upstream side of the intake port, and a regulation valve configured to block a flow from the third port side toward the intake supply side is between the intake supply and the communication passage.

* * * * *